United States Patent
Sundar et al.

(10) Patent No.: US 11,736,293 B1
(45) Date of Patent: Aug. 22, 2023

(54) BINDING WEB COMPONENTS TO PROTECT ACCESSING OF RESOURCES

(71) Applicant: Citigroup Technology, Inc., New York, NY (US)

(72) Inventors: Gayathri Sundar, Irving, TX (US); Mayank Shah, East Windsor, NJ (US); Vernon Miller, Jacksonville, FL (US)

(73) Assignee: CITIGROUP TECHNOLOGY, INC., New York, NY (US)

( * ) Notice: Subject to any disclaimer, the term of this patent is extended or adjusted under 35 U.S.C. 154(b) by 0 days.

(21) Appl. No.: 18/097,036

(22) Filed: Jan. 13, 2023

(51) Int. Cl.
*H04L 9/32* (2006.01)
*H04L 67/02* (2022.01)

(52) U.S. Cl.
CPC .......... *H04L 9/3213* (2013.01); *H04L 67/02* (2013.01)

(58) Field of Classification Search
CPC ............................ H04L 9/3213; H04L 67/02
See application file for complete search history.

(56) References Cited

U.S. PATENT DOCUMENTS

| | | | |
|---|---|---|---|
| 2016/0098484 A1* | 4/2016 | Nguyen | G06F 21/00 707/770 |
| 2018/0203674 A1* | 7/2018 | Dayanandan | G06F 8/35 |

\* cited by examiner

*Primary Examiner* — Esther B. Henderson
(74) *Attorney, Agent, or Firm* — Foley & Lardner LLP

(57) ABSTRACT

Presented herein are systems and methods for binding web components to protect accessing of resources. A first server may receive, from a second server, a request to provide access to content for a first web component on a web application of a customer device. The first server may determine whether to issue an identifier to the customer device responsive to validating the request. The first server may generate, responsive to the determination, the identifier to bind the first web component with a second web component to permit access to the content for the first web component on the web application. The first server may transmit, to the second server, a response including the identifier and the content. The first server may communicate, via the second server, data associated with a user interaction with the content on the first web component bound with the second web component using the identifier.

20 Claims, 14 Drawing Sheets

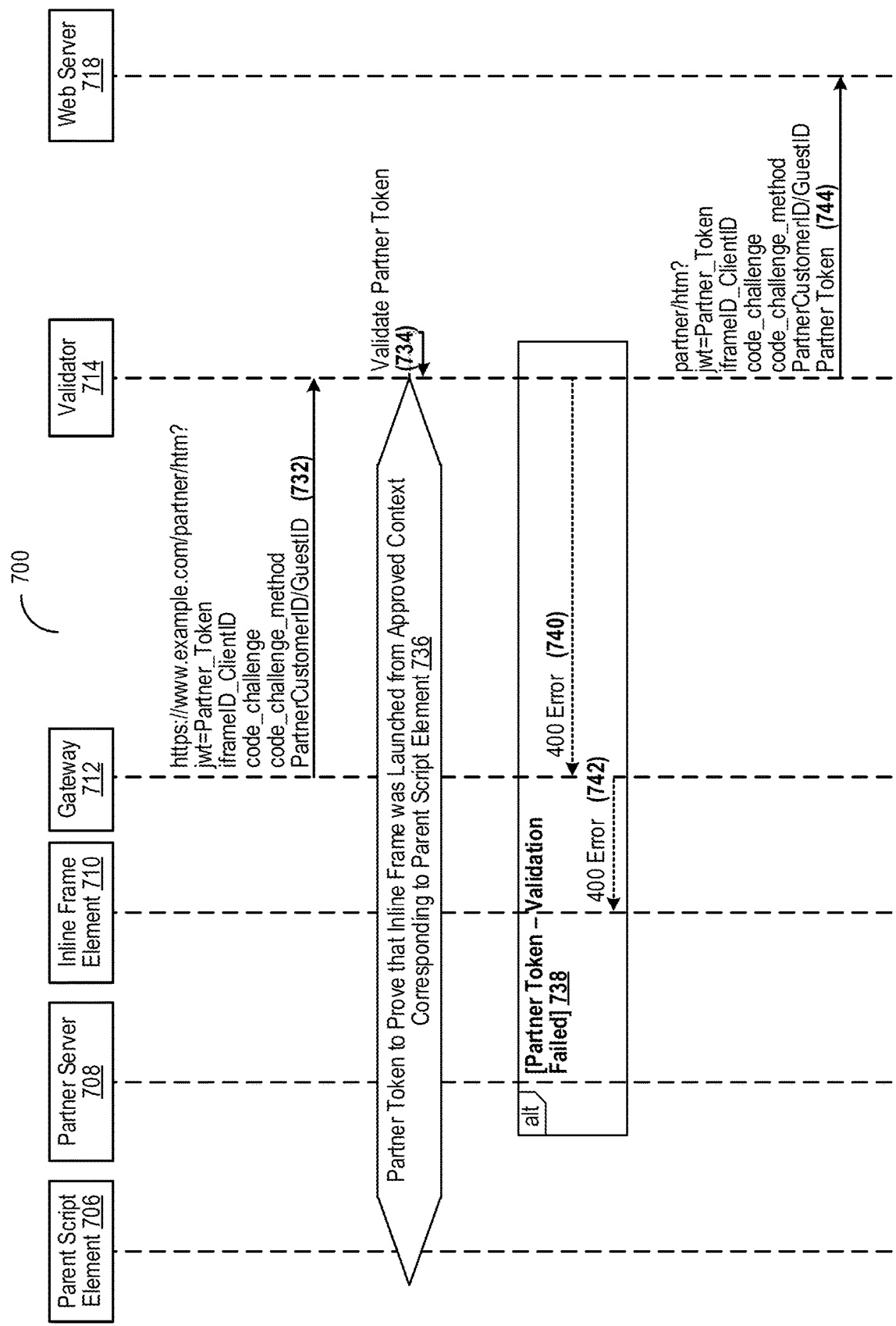

BINDING WEB COMPONENTS TO PROTECT ACCESSING OF RESOURCES

TECHNICAL FIELD

This application generally relates to data security. In particular, the present application relates to binding web components to protect accessing of resources.

BACKGROUND

In a networked environment, a customer device (or end-user device) may receive a webpage from a web server. The webpage may contain primary content provided by a content publisher server, as well as one or more elements (e.g., document object model (DOM) elements) embedded into the webpage for supplemental content from a content provider server. Upon loading the webpage, the customer device may retrieve the primary content from the content publisher server and fetch supplemental content for the one or more elements from content provider servers. The embedding of the elements on the webpage, however, may expose the other web server to security vulnerabilities. The embedded elements may be unaware that that they are being loaded on a webpage that is managed by a server different from a server for the supplemental content. As a result, without visibility to the server for the primary content from the embedded element, such embedded elements and the contents therein can potentially be accessed by rogue entities and be exploited in improper ways.

SUMMARY

Disclosed herein are systems and methods for binding web components to protect from improper access to resources. In networked environments, an application (e.g., a web browser) running on a customer device may retrieve a webpage (e.g., in the form of a web application) from a content publisher server. The webpage may include a component (sometimes herein referred to as elements or objects, such as an inline frame element) embedded therein whose content are to be fetched from a content provider server. In retrieving the webpage, the browser on the customer device may request the content provider server to provide content to insert into the component of the webpage.

Allowing access to the content provider server for content to include into the webpage from the content publisher server may present security risks to the customer device. There may be various approaches to address some of these security vulnerabilities. For example, a cross-original resource sharing (CORS) protocol may be used by the web browser to send a pre-flight request to the content provider server to check whether the content provider server permits accessing from the webpage of the content publisher server. Such approaches, however, may only allow for limited control by the content provider server in controlling content once provided to the web browser and loaded into the component of the webpage. This problem may be exacerbated if the data provided to the web browser is. As such, these approach may allow potentially malicious actors to gain access to the resources of the content provider server through the webpage of the content publisher server.

To address these and other technical challenges, a web server providing content for embedded components on webpage may use an identifier to bind a web component (e.g., an inline frame) to a parent web component (e.g., a script element) on the webpage (e.g., defined using an HyperText Markup Language (HTML)). To load content into the web component of a webpage, the customer device may send a request to the content publisher server that had served the webpage. The content publisher server (also referred herein as a partner server) may serve as a proxy to facilitate communications between the customer device in accessing resources of the content provider server through a gateway. The gateway may reside along a communication path between the content publisher server and the content provider server.

Upon receipt of the request, the content publisher server may generate a token signed using an encryption key (e.g., a private key). The content publisher server may forward the request to the gateway, along with the generated token. The gateway may contain a configuration list of third-party servers and corresponding public certificates (e.g., including public encryption keys provided by third-party servers) that are allowed to access the web server. Using the configuration, the gateway may control access to the content provider server and enable secure communications between the content publisher server and the content provider server.

Upon receipt of the request, the gateway may validate the token by determining whether the encryption key (e.g., a public key) used to sign the token is configured in the list and the signature verification has succeeded. If the token is determined to be invalid, the gateway may provide an indication of failure to validate to the content publisher server. The indication of failure may be to signal that the token is invalid and that the content is not to be provided to the embedded component on the webpage on the customer device. On the other hand, if the token is valid, the gateway may send an indication of successful validation to the content provider server. When the validation of the token is successful, the content provider server may generate a binding identifier and return a response including the binding identifier to the content publisher server. The binding identifier may be used to bind the embedded web component with its parent web component to route interactions and data on the child web component to the content provider server.

With receipt of the response, the content publisher server may generate a new token (sometimes herein referred to as a partner token) including the binding identifier and an identifier for the customer device, among other parameters, encrypted using the encryption key. The other parameters may include, for example, an expiration time, issue time, and an identifier for the content publisher server. The content publisher server may also generate code challenge information. The code challenge information may include a unique random number corresponding to a code challenge verifier and a hash of the unique random number corresponding to a code challenge hash in accordance with a hash function corresponding code challenge method. The content publisher server may send the encrypted token along with the code challenge hash and method to the customer device.

When the token and the code challenge information are received, the customer device may use the parent web component to generate a context for the child web component of the webpage. The bound context may include the token, the code challenge information, a reference identifier for the parent web component (e.g., using postMessage( ) function), and an identifier for the customer device, among other parameters (sometimes herein referred to as claims). Upon the generation of the context, the customer device may send the bound context to the content provider server when launching the request to load the embedded web component. With receipt from the customer device, the content provider server may issue an access token including the parameters of the context. The content provider server may encrypt the access token using the encryption key, and send the access token along with the content and resources for the embedded web component to the customer device. Once loaded, communications through the embedded web component with the content provider server may be protected using the access token, which has the bound context as defined by the parameters.

Subsequently, the embedded web component on the webpage may be dismissed on the customer device. The dismissal of the embedded web component may trigger the context release procedure. Once interactions are completed between the embedded web component from the customer device with the content provider server, the customer device may dismiss the embedded web component by invoking the parent web component. From invoking, the customer device may generate an authorization code token from the parameters of the access token provided by the content provider server. The authorization code token may include the parameters of the access token along with the binding identifier. The customer device may send the authorization code token along with the stored partner token and code challenge information to the content provider server. Upon receipt, the content provider server may validate the authorization code token by determining whether the bounding identifier of the authorization code token matches the bounding identifier stored for the customer device. The content provider server may also validate the code challenge information to ascertain that the embedded web component was indeed dismissed from the bounded context. With the validation, the content provider server may send an acknowledgement along with additional content to the customer device.

In this manner, by providing a binding identifier to bind the embedded web component with the parent web component, the content accessed through the embedded web component may be controlled by the hosting content provider server thereby improving security. Once the context is bound to the parent web component on the webpage, this framework may allow for the customer device to securely and seamlessly access the sensitive data from the content provider server. Furthermore, the passage of the authorization code token from the dismissal of the embedded web component on the customer device to the content provider server may prevent further leakage of sensitive data onto the webpage once the interactions are complete on the web component. The scheme may thus improve data security and privacy while permitting accessing of the content from the content provider server different from the webpage provided by the content publisher server.

Aspects of present disclosure are directed to systems, methods, and non-transitory computer readable media for binding web components to protect resources accessed via web components. A first server may receive, from a second server, a request to provide access to content for a first web component on a web application of a customer device. The first server may determine whether to issue an identifier corresponding to the first web component to the customer device responsive to a validation of the request. The first server may generate, responsive to the determination, the identifier to bind the first web component with a second web component to permit access to the content for the first web component on the web application of the customer device. The second web component may be configured to receive content of the first web component. The first server may transmit, to the second server, a response including the identifier and the content. The first server may communicate, via the second server, data associated with a user interaction with the content presented on the first web component bound with the second web component using the identifier.

In one embodiment, the first server may receive, from the customer device via the second server, a context to bind the first web component with the second web component, the context including a first token generated by the second web component using the identifier. The first server may generate, responsive to validating the context, a second token using at least a portion of the context. The first server may transmit, to the second server, the second token to encrypt the communications of the data from the first web component.

In another embodiment, the first server may receive the context including (i) the first token and (ii) an information to permit communications between the first web component and the second web component. The first server may generate the second token to include at least a portion of the first token and the information.

In yet another embodiment, the first server may receive, from the customer device via the second server, an indication to unbind the first web component from the second web component responsive to a termination of the first web component. The indication may identify an authorization code token generated using the identifier. The first server may determine, responsive to validating the authorization code token of the indication, to unbind the first web component from the second web component.

In yet another embodiment, the first server may identify, from the authorization code token of the indication, the identifier. The first server may validate the authorization code token responsive to the identifier identified from the authorization code token matching the identifier transmitted in the response. In yet another embodiment, the first server may determine, responsive to failure to validate a second request, that the customer device is not to be issued with a second identifier corresponding to a third web component of a second customer device. The first server may transmit, to a third server, an indication to deny the third web component access to content of the first server, responsive to determining that the customer device is not to be issued with the second identifier.

In yet another embodiment, the first server may validate the request responsive to a gateway identifying the second server from which the request is received as permitted to access the first server. In yet another embodiment, the first server may receive the request access to content for an inline frame launched by the application the customer device responsive to accessing a webpage. In yet another embodiment, the first server may transmit the response to cause the second server to generate a token using the identifier to encrypt the communications of the data associated with the user interactions with the first web component. In yet another embodiment, the first server may generate the identifier referencing a binding of the first web component with the second web component.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

FIGS. 7A and 7B depicts communication diagrams of an example process of launching embedded web components to bind with parent web components in accordance with an embodiment;

DETAILED DESCRIPTION

Figure 1:
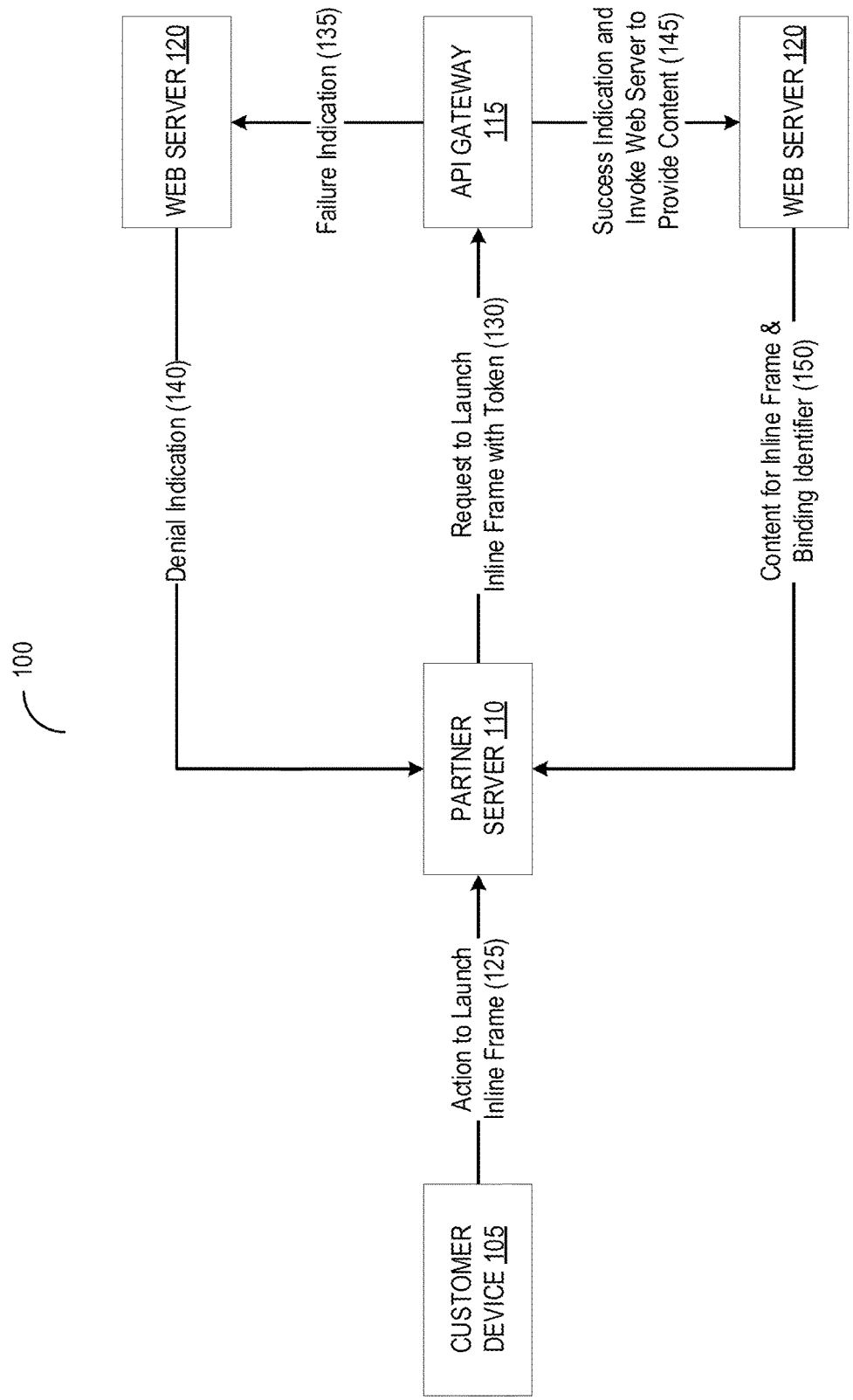
FIG. 1 depicts a block diagram of an environment for binding web components to protect accessing of resources in accordance with an embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods for binding web components to protect accessing of resources in computer networked environments. A customer device may receive a webpage from a content publisher server, with a web component embedded on the webpage. To load content for the web component, the customer device may send a request to a content provider server via a gateway to provide the content. The request may be generated by a parent web component to the embedded web component. Upon receipt and validation of the request, the content provider server may generate and transmit a binding identifier for the web component to a parent web component on the webpage. The content publisher server may generate a token using the binding identifier along with other parameters, and send the token to the customer device. Using the token from the content publisher server, the customer device may in turn generate a context to bind the web component to the web component, and send the context to the content provider server. With receipt, the content provider server may generate an access token based on the context, and return the access token to the customer device. Using the access token, data from the embedded web component may be protected from outside entities, and may be communicated with the content publisher server. Although the example embodiments describe a web component provided by the content publisher server for the content provider server, it is intended that the systems and methods may be implemented in other environments involving a web server providing a web component to a partner server.

FIG. 1 depicts a block diagram of an environment 100 for binding web components to protect accessing of resources. The environment 100 may include at least one customer device 105 (sometimes herein referred to as a customer or a client device), at least one partner server 110 (sometimes herein referred to as a content publisher server or an access server), at least one application programming interface (API) gateway 115 (sometimes herein referred to as a gateway), and at least one web server 120 (sometimes herein referred to as a content provider server, resource server, or a web service), among others. The API gateway 115 and the web server 120 may be operated by or otherwise associated with a resource provider or an application host. The partner server 110 may be operated by or otherwise associated with a partner entity that is authorized to access or otherwise interface with the API gateway 115 and the web server 120. The customer device 105 may be operated by or otherwise associated with an end-user attempting to access the resource provider or the application host via the partner server 110. For example, the application host may be a service (e.g., account information retrieval, transaction, or loan application) provided by a banking institution. The end-user may be a customer attempting to access services provided by the banking institution via the host.

Embodiments may comprise additional or alternative components or omit certain components from those of FIG. 1 and still fall within the scope of this disclosure. For example, the API gateway 115 and the web server 120 may be part of the same device. Various hardware and software components of one or more public or private networks may interconnect the various components of the environment 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols, among others.

While loading a webpage, the customer device 105 detects an action to launch an inline frame on the webpage (125). The webpage may include one or more elements (sometimes herein referred to as web components) embedded therein, such as the inline frame to be loaded. The action may correspond to an invocation by the customer device 105 running a script (e.g., a JavaScript script element) corresponding an element that is a parent to the inline frame element on the webpage. Upon detecting the action, the customer device 105 may send a request to load the inline frame to the partner server 110.

The partner server 110 forwards the request to launch the inline frame with a token (130). Upon receiving from the customer device 105, the partner server 110 may generate the token to include in the request. In generating, the partner server 110 may encrypt or sign the token using an encryption key. The token may be, for example, packaged in accordance with a JavaScript Object Notation (JSON) web token (JWT) and may be encrypted using a public key received out-of-band by the partner server 110 from the API gateway 115. With the generation, the partner server 110 may send the token along with the request to the API gateway 115.

Upon receipt of the request, the API gateway 115 validate that the token by determining whether the token has been signed by the partner server 110 using the encryption key provided by the partner server 110. The API gateway 115 may maintain a configuration of whitelisted servers, such as the partner server 110, and use a public key certificate to validate encryption keys used to sign the tokens. When the validation of the token fails, the API gateway 115 may send a failure indication to the web server 120 (135). The web server 120 may in turn transmit an indication denial to the partner server 110 to specify that accessing of content for the inline frame is denied (140).

On the other hand, when the validation of the token succeeds, the API gateway 115 may send an indication of success and invoke the web server 120 to provide content for the inline frame (145). Upon receipt of the indication, the web server 120 may send the content for the inline frame along with a binding identifier to bind the inline frame with the parent script element to the partner server 110 (150). The partner server 110 in turn may generate a new token based on the binding identifier, along with other parameters, and pass the new token to the customer device 105. Using the token, the customer device 105 may generate a context to bind the inline frame element with the parent script element, and may return the context to the web server 120. With the passage of context, communications originating from user interactions with the inline frame element on the customer device 105 may be protected and exchanged with the web server 120.

Figure 2:
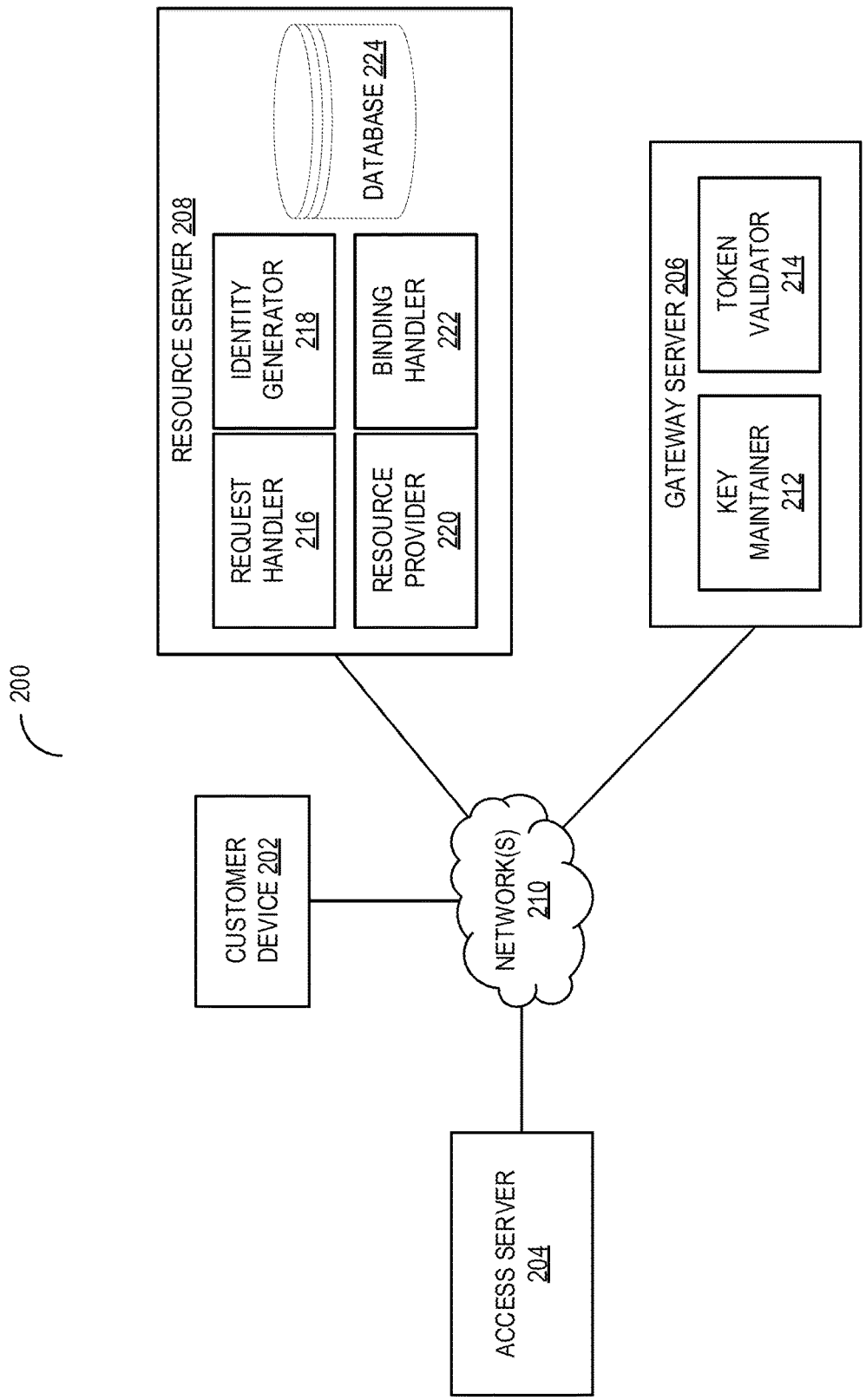
FIG. 2 depicts a block diagram of an example system for binding web components to protect accessing of resources in accordance with an embodiment.

FIG. 2 depicts a block diagram of a system 200 for binding web components to protect accessing of resources. The system 200 may include at least one customer device 202 (sometimes referred to herein as a client device or customer), at least one access server 204 (sometimes referred to herein as a partner server or as a content publisher server), at least one gateway server 206 (sometimes referred to herein as a gateway), at least one resource server 208 (sometimes referred to herein as a resource service or content provider server), and one or more networks 210, among others. The gateway server 206 may include at least one key maintainer 212 and at least one token validator 214. The resource server 208 may include at least one request handler 216, at least one identity generator 218, at least one resource provider 220, at least one binding handler 222, and at least one database 224. Embodiments may comprise additional or alternative components or omit certain components from those of FIG. 2, and still fall within the scope of this disclosure. For example, the gateway server 206 and the resource server 208 may be part of the same device.

Various hardware and software components of one or more public or private networks 210 may interconnect the various components of the system 200. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols, among others.

The customer device 202 may be any computing device comprising one or more processors coupled with memory and software, and capable of performing the various processes and tasks described herein. The customer device 202 may be in communication with the access server 204, the gateway server 206, and the resource server 208 via the network 210. Communications from the customer device 202 may be redirected via the network 210 from one component to another. For example, a request to access the resource server 208 may be first redirected to the access server 204, then the gate server 206, and then to the resource server 208.

The access server 204 may be any computing device comprising one or more processors coupled with memory and software and capable of performing the various processes and tasks described herein. The access server 204 may be in communication with the customer device 202, the gateway server 206, and the resource server 208 via the network 210. Although shown as a single access server 204, the access server 204 may include any number of computing devices. The access server 204 may perform an initial authentication of the customer device 202 in accessing the gateway server 206. From the initial authentication, the access server 204 may generate and issue an initial token for the customer device 202.

The gateway server 206 may be any computing device comprising one or more processors coupled with memory and software and capable of performing the various processes and tasks described herein. The gateway server 206 may be in communication with the customer device 202, the access server 204, and the resource server 208 via the network 230. Although shown as a single gateway server 206, the gateway server 206 may include any number of computing devices. The gateway server 206 may control communications from the access server 204 and by extension the customer device 202 to the resource server 208. Within the gateway server 206, the key maintainer 212 may be or may include computer-readable machine code executable by the gateway server 206 may store and maintain encryption keys to be used to encrypt or sign tokens in requests. The token validator 214 may be or may include computer-readable machine code executable by the gateway server 206 to validate requests received via the network 210

The resource server 208 may be any computing device comprising one or more processors coupled with memory and software, and capable of performing the various processes and tasks described herein. The resource server 208 may be in communication with the customer device 202, the access server 204, and the gateway server 206 via the network 210, as well as the token database 224. Although shown as a single resource server 208, the resource server 208 may include any number of computing devices. The gateway server 206 may host, maintain, or otherwise include a resource. The resource may include an application, programs, processes, files, or data, among others. Access to the resource maintained by the gateway server 206 may be controlled by the access server 204 and the resource server 208.

Within the resource server 208, the request handler 216 may be or may include computer-readable machine code executable by the resource server 208 to parse and process requests validated by the gateway server 206. The identity generator 218 may be or may include computer-readable machine code executable by the resource server 208 to create binding identifiers to be used to bind web components (sometimes herein referred to as elements or objects). The resource provider 220 may be or may include computer-readable machine code executable by the resource server 208 to provide content or resources requested by the customer device 202 when the access is granted to the customer device 202. The binding handler 222 may be or may include computer-readable machine code executable by the resource server 208 to manage binding of the web components on the customer device 202.

Figure 3:
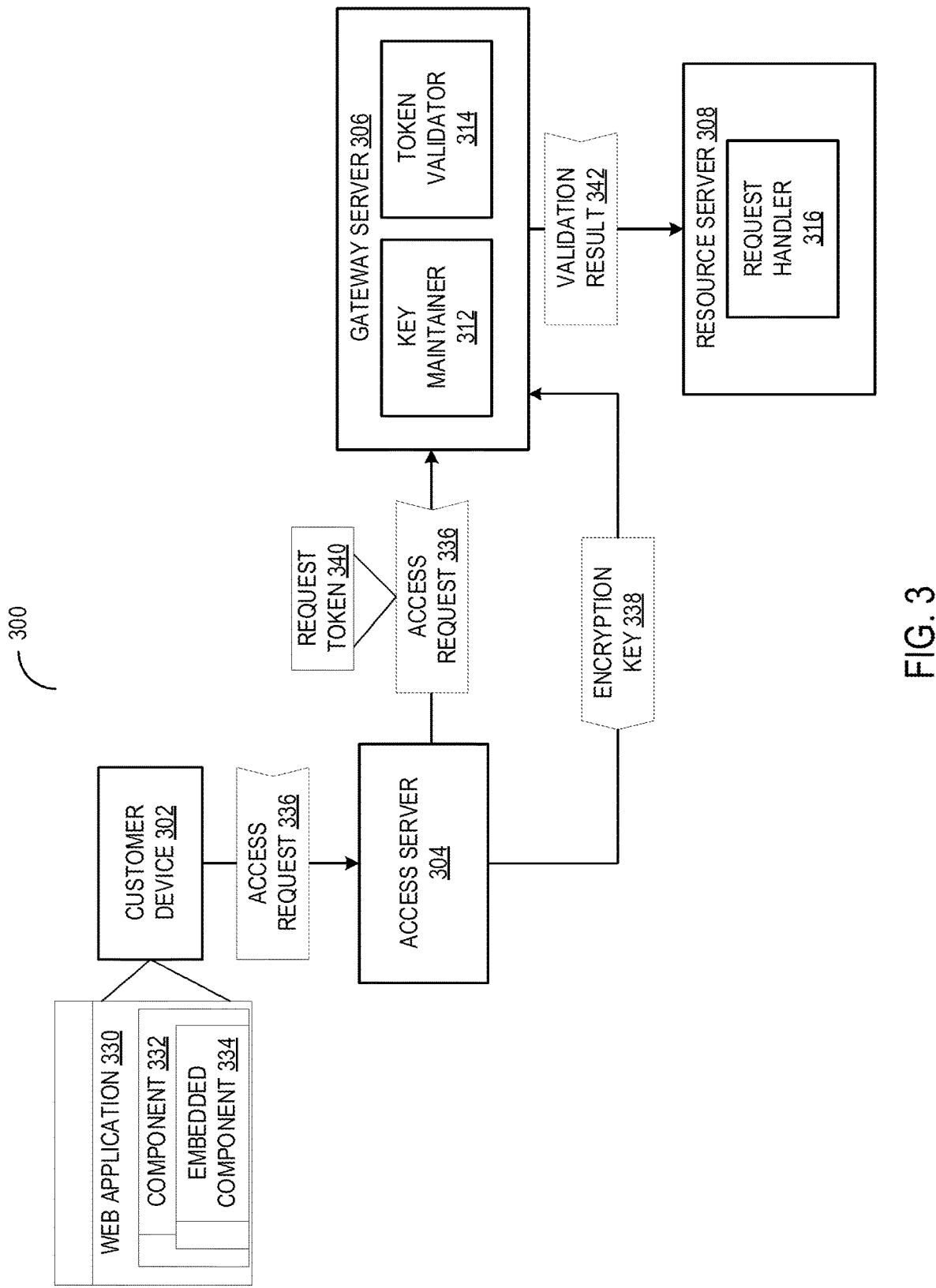
FIG. 3 depicts a block diagram of an example system for validating access requests to access resources in accordance with an embodiment.

FIG. 3 depicts a block diagram of a system 300 for validating access requests to access resources. The system 300 may include at least one customer device 302 (sometimes referred to herein as a client device or customer), at least one access server 304 (sometimes referred to herein as a partner server as a content publisher server), at least one gateway server 306 (sometimes referred to herein as a gateway), and at least one resource server 308 (sometimes referred to herein as a resource service or content provider server), among others. The gateway server 306 may include at least one key maintainer 312 and at least one token validator 314, among others. The resource server 308 may include at least one request handler 316, among others.

Embodiments may comprise additional or alternative components or omit certain components from those of FIG. 3 and still fall within the scope of this disclosure. Various hardware and software components of one or more public or private networks may interconnect the various components of the system 300. Each component in system 300 (such as the customer device 302, the access server 304, the gateway server 306 and its sub-components, and the resource server 308 and its subcomponents) may be any computing device comprising one or more processors coupled with memory and software and capable of performing the various processes and tasks described herein.

The customer device 302 may have received at least one web application 330 from the access server 304. The web application 330 may include at least one parent web component 332 (sometimes herein referred to as a parent element or parent object) and at least one embedded web component 334 (sometimes herein referred to as a child component, element, or object). In some embodiments, the parent web component 332 may correspond to the web application 330 itself. The web application 330 may be a webpage defined in accordance with a markup such as HyperText Markup Language (HTML), Extensible Markup Language (XML), JavaScript, or PHP, among others, or any combination thereof.

In the web application 330, the parent web component 332 may correspond to a script element (e.g., an HTML script object) and the embedded web component 334 may correspond to an inline frame element (e.g., an HTML inline frame object). At least one of the parent web component 332 or the embedded web component 334 may correspond to a graphical user interface element on the webpage defining the web application 330. In a hierarchy of the HTML document object model (DOM) tree defining the web application 330, the parent web component 332 and the embedded web component 334 may have a parent-child relationship. While described herein primarily in terms of a HTML webpage, other scripts and settings may be used to implement the web application 330 and the associated functionalities with the web components 332 and 334 detailed herein.

The parent web component 332 may contain or include instructions to control, specify, or otherwise define the functionalities of embedded web component 334. The instructions may have been configured in the web application 330, and may be provided by the access server 304. The instructions for the parent web component 332 of the web application 330 may be provided by the access server 304. In some embodiments, the access server 304 may have received the instructions for the parent web component 332 from the gateway server 306, the resource server 308, or another associated entity. The content for the embedded web component 334 may be not provided by the access server 304, and may initially not be loaded on the web application 330. Instead, the content of the embedded web component 334 is to be retrieved by the customer device 302 from the resource server 308. The retrieval of the content from the resource server 308 may be defined in part by the instructions included in the parent web component 332. The parent web component 332 may retrieve, load, or otherwise receive the content for the embedded web component 334.

When loading the web application 330, the customer device 302 calls, runs, or otherwise invokes the instructions in parent web component 332. In some embodiments, the customer device 302 may invoke the instruction in the parent web component 332 in response to detecting an interaction with the embedded web component 334. From invoking, the customer device 302 may create, output, or otherwise generate at least one access request 336 to provide the customer device 302 access to content for the embedded web component 334 on the web application 330. The access request 336 may be, for example, a HyperText Transfer Protocol (HTTP) request method, such as a GET or POST method, among others. The access request 336 may include an identifier corresponding to the customer device 302, an instance of the web application 330 on the customer device 302, or a user of the customer device 302, among others. The access request 336 may identify the access server 304 as a destination of the access request 336. In some embodiments, the access request 336 may identify the gateway server 306 or the resource server 308 as the destination. With the generation, the customer device 302 provides, sends, or otherwise transmits the access request 336 to the access server 304.

Separately, the key generator 312 executing on the gateway server 306 may maintain and store at least one encryption key 338 for the access server 304. The encryption key 338 may be used to encrypt and decrypt communications between the access server 304 and the gateway service 306. The encryption key 338 may also be used to validate tokens provided by the access server 304 for accessing the resource server 308 through the gateway server 306. The encryption key 338 may be generated in accordance with any asymmetric encryption algorithm. For example, the access server 304 may generate a public key and a private key in an accordance with an asymmetric cryptography (e.g., Rivest-Shamir-Adleman (RSA) algorithm). Upon generation, the access server 304 provides, sends, or otherwise transmits the public key as the encryption key 338 to the key maintainer 312. The access server 304 may store and maintain the private key associated with the encryption key 338. The key maintainer 312 in turn stores and maintains the public key as the encryption key 338 on the gateway server 306. For example, the key generator 312 may store the public key and an identifier referencing the access server 304 on a list of trusted access servers.

In turn, the access server 304 retrieves, identifies, or otherwise receives the access request 336 from the customer device 302. In some embodiments, the access server 304 may intercept the access request 336 from the customer device 302 and in route to the gateway server 306 or the resource server 308. Upon receipt, the access server 304 may write, produce, or otherwise generate at least one request token 340 to insert or include into the access request 336. The request token 340 may serve to authenticate the access server 304 with the gateway server 306 for communications between the customer device 302 and the resource server 308 through the access server 304 and the gateway server 306. The request token 340 may be packaged or generated in accordance with a format, such as a JavaScript Object Notation (JSON) object (e.g., a JSON web token (JWT)).

To generate the request token 340, the access server 304 may use at least a portion of the access request 336 or other parameters, such an identifier corresponding to the access server 304 or a communication session between the customer device 302 and the access server 304. The request token 340 may identify or include a set of claims, such as: an expiration time specifying or defining a duration of time in which the request token 340 is valid; an issue time defining or identifying a time at which the request token 340 is created; the issuer identifier corresponding to the access server 304; or the token identifier uniquely referencing the request token 340; and an identifier corresponding to the customer device 302, among others.

In some embodiments, the access server 304 may produce, create, or otherwise generate code challenge information to secure communications between the customer device 302 and the resource server 308 originating from the embedded web component 334. The code challenge information may be used to specify or define a communication sequence to authenticate and secure communications between the customer device 302 and the resource server 308 via the access server 304 and the gateway server across the network. The code challenge information may identify or include a code challenge verifier, a code challenge hash, and a code challenge method. The code challenge verifier may be or include a value (e.g., a pseudo-random generated number or alphanumeric characters). The code challenge hash may be or include a hash of the value of the code challenge verifier, in accordance with a hash value specified by the code challenge method. The hash function used as the code challenge method may include, for example, a cryptographic hash function, such as a secure hash algorithm (SHA) such as SHA-1, SHA-2, and the like, a digital signature algorithm (DSA), or a message-digest algorithm (e.g., MD5), among others. The code challenge method may be specified or identified in the code challenge information. With the generation, the access server 304 may sign or encrypt the request token 340 (or the overall access request 336) using the private key associated with the previously provided encryption key 338. Upon signing, the access server 304 provides, sends, or transmits the access request 336 including the request token 340 to the gateway server 306.

The token validator 314 executing on the gateway server 306 retrieves, identifies, or otherwise receives the access request 336 from the access server 304. With receipt, the token validator 314 parses the access request 336 to extract or identify the contents therein, such as the request token 340. The token validator 314 may decrypt the request token 340 using an encryption key associated with the encryption key 338. For example, the encryption key 338 may be a public key, and the token validator 314 may decrypt the contents of the request token 340 (or the overall access request 336) using a private key that was previously generated in conjunction with the public key. The token validator 314 may decrypt the request token 340 to extract the contents therein, such as the identifier corresponding to the access server 304. The token validator 314 may identify the access server 304 corresponding to the identifier.

Upon decryption, the token validator 314 may identify or determine whether the access server 304 is one of a trusted list of access servers. Based on the determination, the token validator 314 may produce, output, or otherwise generate a validation result 342 to indicate the determination to the resource server 308. The list may define or identify access server 304 whose access requests are to be trusted for further processing at the gateway server 306. When the access server 304 is determined to be not any of the trusted set, the token validator 314 may identify or determine that the access server 304 is restricted from accessing the resource server 308. The token validator 314 may also generate the validation result 342 to indicate that a failure to validate the access request 336 (or the request token 340) from the access server 304.

Otherwise, when the access server 304 is determined to be in the trusted set, the token validator 314 may identify or determine that the access server 304 is permitted to access the resource server 308. The token validator 314 may also generate the validation result 342 to indicate successful validation of the access request 336 (or the request token 340) from the access server 304. In either case, with the generation, the token validator 314 provides, transmits, or otherwise sends the validation result 342 to the resource server 308. In conjunction, the token validator 314 may provide, forward, or otherwise send the access request 336 from the access server 304 to the resource server 308.

The request handler 316 executing on the resource server 308 may retrieve, identify, or otherwise receive the validation result 342. The request handler 316 may also receive the access request 336 along with the validation result 342 from the access server 304. Upon receipt, the request handler 316 may parse the access request 336 to extract or identify the contents therein. From parsing, the request handler 316 may extract or identify the identifier corresponding to the customer device 302, the web application 330, or the user. The request handler 316 may also identify the identifier corresponding to the access server 304. The request handler 316 may also parse the validation result 342 to determine whether the validation of the access request 336 succeeded or failed. Based on the validation result 342, the request handler 316 may determine whether the customer device 302 is to be issued a binding identifier corresponding to the embedded component 334.

When the validation result 342 identifies the validation of the access request 336 as a failure, the request handler 316 may determine that the customer device 302 is not to be issued the binding identifier. Furthermore, the request handler 316 may provide, send, or otherwise transmit a response including an indication to deny the embedded web component 334 access content on the resource server 308 for the embedded web component 334. The indication may be transmitted to the customer device 302 directly or indirectly via the gateway server 306 and the access server 304. The process of requesting access to content for the embedded web component 334 may be attempted again, or terminated upon receipt of the denial indication. Otherwise, when the validation result 342 identifies the validation of the access request 336 as a success, the request handler 316 may determine that the customer device 302 is to be issued the binding identifier. Details of the functionality associated with the binding identifier is described below in conjunction with FIGS. 4-6.

Figure 4:
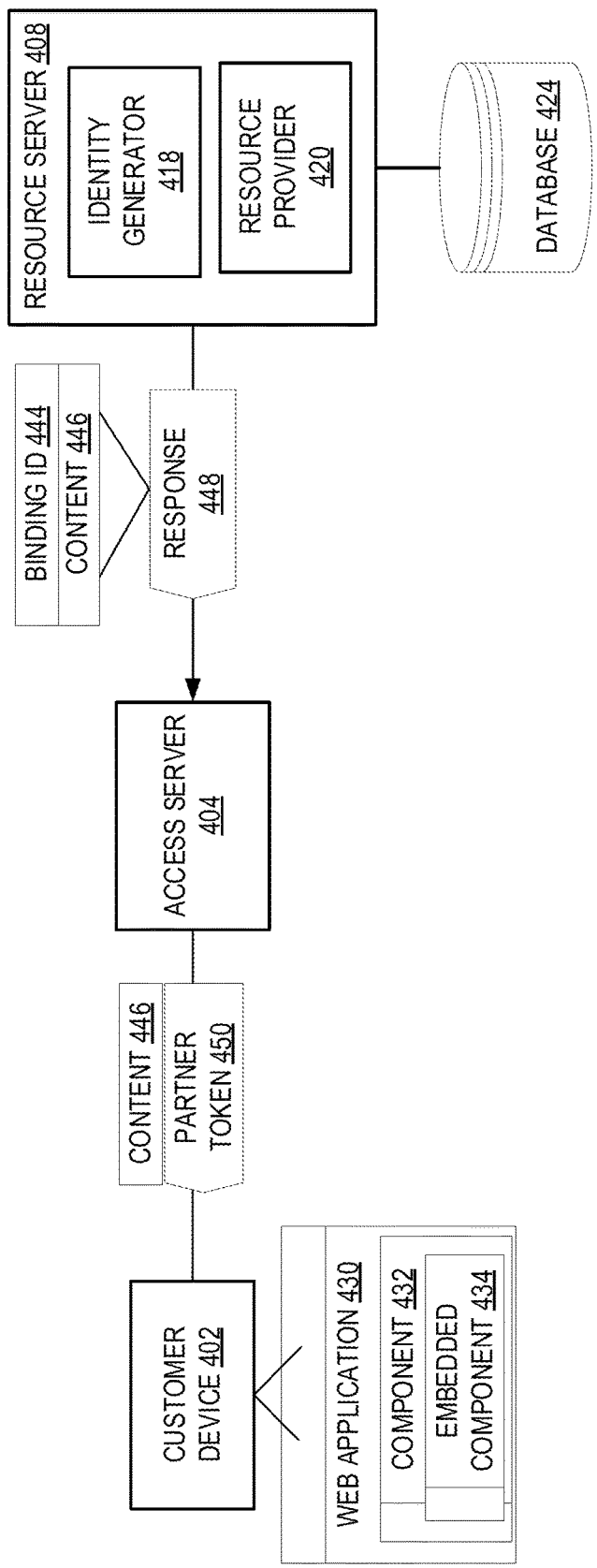
FIG. 4 depicts a block diagram of an example system for generating binding identifiers for web components in accessing resources in accordance with an embodiment.

FIG. 4 depicts a block diagram of a system 400 for generating binding identifiers for web components in accessing resources. The system 400 may include at least one customer device 402 (sometimes referred to herein as a client device or customer), at least one access server 404 (sometimes referred to herein as a partner server or as a content publisher server), and at least one resource server 408 (sometimes referred to herein as a resource service or content provider server), among others. The customer device 402 may have received or receive at least one web application 430 from the access server 404. The web application 430 may include at least one parent web component 432 (sometimes herein referred to as a parent element or parent object) and at least one embedded web component 434 (sometimes herein referred to as a child component, element, or object). The resource server 408 may include at least one identity generator 418 and at least one resource provider 420, among others.

Embodiments may comprise additional or alternative components or omit certain components from those of FIG. 4 and still fall within the scope of this disclosure. Various hardware and software components of one or more public or private networks may interconnect the various components of the system 400. Each component in system 400 (such as the customer device 402, the access server 404, and the resource server 408 and its subcomponents) may be any computing device comprising one or more processors coupled with memory and software and capable of performing the various processes and tasks described herein.

The identity generator 418 executing on the resource server 408 produces, creates, or otherwise generates at least one binding identifier 444. The binding identifier 444 may be to bind the embedded web component 434 with the parent web component 432 to permit access to the content for the embedded web component 434 on the web application 430. The identity generator 418 may generate the binding identifier 444, when the customer device 402 is to be issued the binding identifier 444 in response to validating an access request. The binding identity 444 may be a set of alphanumeric characters to uniquely reference the instance of the embedded web component 434 of the web application 430 on the customer device 402. In some embodiments, the identity generator 418 may generate the binding identifier 444 using at least a portion of the access request, such as the identifier associated with the customer device 402 or the access server 404, among others. With the generation, the identity generator 418 may store and maintain the binding identifier 444 on the database 424. The identity generator 418 may store and maintain an association of the binding identifier 444 with the identifier of the customer device 402 or the access server 404, or any other from the access request, among others.

The resource provider 420 executing on the resource server 408 retrieves, obtains, or otherwise identifies content 446 (sometimes herein referred to as initial content) to provide to the embedded web component 434. The content 446 may identify or include data, such as additional instructions, an image, text, or multimedia, among others, to be inserted into the embedded web component 434 on the web application 430. In some embodiments, the additional instructions of the content 446 may be executed by the parent web component 432 or in accordance with the instructions of the parent web component 432. For example, the content 446 may include instructions and graphical user interface (GUI) elements for various services, such as account information retrieval, transaction, or loan application in an online bank application. Using the access request from the customer device 402, the resource provider 420 may fetch or retrieve the content 446 from the database 424 (or another data source) for the embedded component 434. For example, the resource provider 420 may identify which content 446 to provide based on a content identifier (e.g., a uniform resource locator (URL)) included by the script in the parent web component 432 in the access request. With the generation of the binding identifier 444 and retrieval of the content 446, the resource provider 420 provides, sends, or otherwise transmits at least one response 448 to the access server 404. The response 448 may identify or include the binding identifier 444 and the content 446. In some embodiments, the response 448 may be provided by the resource provider 420 to the customer device 402 via the access server 404.

The access server 404 in turn retrieves, identifies, or receives the response 448 from the resource server 408. Upon receipt, the access server 404 may parse the response 448 to extract or identify the binding identifier 444 and the content 446. With the identification, the access server 404 may generate at least one partner token 450 using at least a portion of the response 448, such as the binding identifier 444. The partner token 450 may also be used to encrypt or decrypt communications of data associated with the embedded web component 434 (e.g., user interactions) from the customer device 402. The partner token 450 may be used to facilitate accessing of additional content for the embedded web component 434 on the customer device 402 from the resource server 408. The access server 404 may generate the partner token 450 in accordance with a format, such as a JavaScript Object Notation (JSON) object (e.g., a JSON web token (JWT)), among others.

The partner token 450 may identify or include a set of claims (sometimes herein referred to as parameters or information), such as: the binding identifier 444 from the response 448; an expiration time specifying or defining a duration of time in which the partner token 450 is valid; an issue time defining or identifying a time (e.g., a time stamp) at which the partner token 450 is created; an issuer identifier corresponding to the access server 404; a token identifier uniquely referencing the partner token 450 (e.g., to protect from replay); and an identifier corresponding to the customer device 402, among others. With the generation, the access server 404 may sign or encrypt the partner token 450 using the encryption key (e.g., a private key previously generated by the access server 404).

In conjunction, the access server 404 may produce, create, or otherwise generate code challenge information to secure communications between the customer device 402 and the resource server 408 originating from the embedded web component 434. The code challenge information may be used to specify or define a communication sequence to authenticate and secure communications between the customer device 402 and the resource server 408 via the access server 404 and the gateway server across the network. The code challenge information may identify or include a code challenge verifier, a code challenge hash, and a code challenge method. The code challenge verifier may be or include a value (e.g., a pseudo-random generated number or alphanumeric characters). The code challenge hash may be or include a hash of the value of the code challenge verifier, in accordance with a hash value specified by the code challenge method. The hash function used as the code challenge method may include, for example, a cryptographic hash function, such as a secure hash algorithm (SHA) such as SHA-1, SHA-2, and the like, a digital signature algorithm (DSA), or a message-digest algorithm (e.g., MD5), among others. The code challenge method may be specified or identifier in the code challenge information.

Upon generation, the access server 404 may store and maintain the partner token 450 and the code challenge information on the access server 404 (e.g., on a storage or a database accessible to the access server 404). In some embodiments, the access server 404 may store an association of the partner token 450 and the code challenge information with the identifier associated with the customer device 402. In conjunction, the access server 404 provides, sends, or otherwise transmits the content 446 to the customer device 402. The access server 404 may transmit the partner token 450 and the code challenge information, along with the content 446, to the customer device 402.

The customer device 402 in turn retrieves, identifies, or otherwise receives the content 446 from the access server 404. The customer device 402 may receive the partner token 450 and the code challenge information, along with the content 446, from the access server 404. Upon receipt, the customer device 402 may load, insert, or include the content 446 onto the embedded web component 434. The loading of the content 446 may be in accordance with the instructions in the parent web component 432. For example, the parent web component 432 while run by the customer device 402, may receive the content 446 from the access server 404, and may render graphics provided in the content 446 within the embedded web component 434. The customer device 402 may continue to process the partner token 450 and the code challenge information as detailed herein below.

Figure 5:
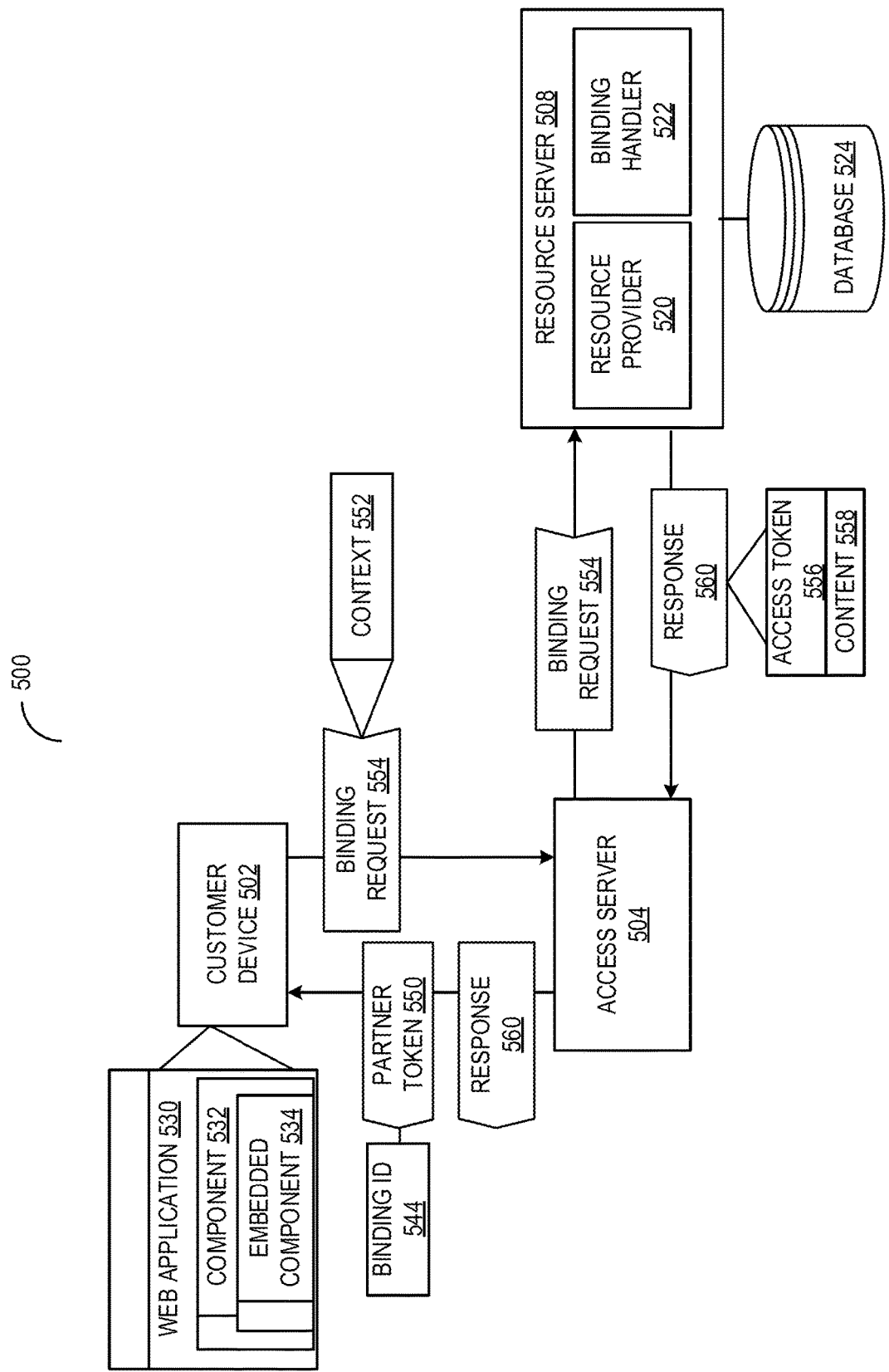
FIG. 5 depicts a block diagram of an example system for generating access tokens for providing access to resources via web components in accordance with an embodiment.

FIG. 5 depicts a block diagram of a system 500 for generating access tokens for providing access to resources via web components. The system 500 may include at least one customer device 502 (sometimes referred to herein as a client device or customer), at least one access server 504 (sometimes referred to herein as a partner server or as a content publisher server), and at least one resource server 508 (sometimes referred to herein as a resource service or content provider server), among others. The customer device 502 may have received or receive at least one web application 530 and at least one partner token 550 from the access server 504. The web application 530 may include at least one parent web component 532 (sometimes herein referred to as a parent element or parent object) and at least one embedded web component 534 (sometimes herein referred to as a child component, element, or object). The resource server 508 may include at least one resource handler 520 and the binding handler 522.

Embodiments may comprise additional or alternative components or omit certain components from those of FIG. 5 and still fall within the scope of this disclosure. Various hardware and software components of one or more public or private networks may interconnect the various components of the system 500. Each component in system 500 (such as the customer device 502, the access server 504, and the resource server 508 and its subcomponents) may be any computing device comprising one or more processors coupled with memory and software and capable of performing the various processes and tasks described herein.

The customer device 502 creates, produces, or otherwise generates at least one bound context 552 (sometimes herein referred to a component bound context, binding context, or generally as context). The customer device 502 may generate the bound context 552 using at least a portion of the partner token 550, such as the binding identifier 544 from the resource server 508. In some embodiments, the customer device 502 may use the code challenge information received from the access server 504 to generate the bound context 552. The generation of the bound context 552 may be in accordance with the instructions in the parent web component 532 of the web application 530. The bound context 552 may be to integrate or bind at least a portion of the functionalities embedded web component 534 to the parent web component 532 in the web application 530. For instance, the bound context 552 may permit the parent web component 532 to receive data, events, or user interactions detected and passed from the embedded web component 534.

The bound context 552 may identify or include at least a portion of the partner token 550, such as: the binding identifier 544; the expiration time specifying or defining a duration of time in which the partner token 550 is valid; an issue time defining or identifying a time at which the partner token 550 is created; the issuer identifier corresponding to the access server 504; or the token identifier uniquely referencing the partner token 550; and an identifier corresponding to the customer device 502, among others. The bound context 552 may identify or include at least a portion of the code challenge information, such as: the code challenge verifier (e.g., random number or value), the code challenge hash (e.g., hash resultant of the verifier), and the code challenge method (e.g., the hash function used to calculate the hash), among others.

Continuing on, the bound context 552 may identify or include at least one registration information. The registration information may permit communications (e.g., passage of data) between the parent web component 532 and the embedded web component 534. The registration information may identify or define communications between the parent web component 532 and the embedded web component 534. With the registration information, the bound context 552 may enable data originating from the embedded web component 534 to be communicated with the parent web component 532 in route to the resource server 508. For example, the register information may include data associated with an invocation of the HTML postMessage( ) function from the embedded web component 534 (e.g., inline frame element) to the parent web component 532 (e.g., script element). The bound context 552 may identify or include the identifier corresponding to the customer device 502, the instance of the web application 530, or the user (e.g., an account or user profile) of the web application 530 or the customer device 502, among others.

With the generation, the customer device 502 may output, produce, or otherwise at least one binding request 554 (sometimes herein referred to as a query or request). The binding request 554 may identify or include the bound context 552. The customer device 502 provides, sends, or otherwise transmits the binding request 554 including the bound context 552 to the resource server 508 via the access server 504 and the gateway server. When the binding request 554 is received at the access server 504, the access server 504 may forward, send, or otherwise transmit the binding request 554 to the resource server 508 via the gateway server. The binding request 554 may be encrypted and decrypted using the encryption key previously received from the access server 504 to secure communications between the access server 504 and the gateway server to access the resource server 508. In some embodiments, the gateway server between the access server 504 and the resource server 508 may perform validation on the binding request 554 as with the initial access request described above.

The binding handler 522 executing on the resource server 508 retrieves, identifies, or otherwise receives the binding request 554 from the customer device 502 via the access server 504. Upon receipt, the binding handler 522 may process or parse the binding request 554 to extract or identify the context 552 therefrom. The binding handler 522 may validate the binding request 554 based on the contents of the context 552. From the context 552 of the binding request 554, the binding handler 522 may extract or identify the binding identifier 544, among other parameters. The binding handler 522 may access the database 524 to find, retrieve, or identify the binding identifier 544 for the customer device 502 (e.g., using the identifier corresponding to the customer device 502 from the binding request 554). The binding handler 522 may compare the binding identifier 544 identified from the binding request 554 with the binding identifier 544 from the database 524 for the customer device 502.

If the binding identifiers do not match or correspond, the binding handler 522 may identify or determine that the context 552 is invalid. The binding handler 522 may limit or restrict accessing of resources for the embedded web component 534. When the validation of the context 552 fails, the binding handler 522 may return, send, or otherwise transmit an indication of the failure to validate the context 552 of the binding request 554 to the customer device 502. The indication may be transmitted through the gateway server and the access server 504. The binding handler 522 may terminate the process of providing access to resources for the embedded web component 534 on the customer device 502.

On other hand, if the binding identifiers match or correspond, the binding handler 522 may identify or determine that the context 552 is valid. When the validation of the context 552 is successful, the binding handler 522 outputs, creates, or otherwise generates at least one access token 556 (sometimes referred to herein as a customer access token, bearer token, or a token) using at least a portion of the context 552. The access token 556 may be to finalize the binding of the embedded web component 534 with the parent web component 532 on the web application 530. The access token 556 may also be used to encrypt or decrypt communications of data associated with the embedded web component 534 (e.g., user interactions) from the customer device 502. The access token 556 may define the constraints and may generate the partner token 550 in accordance with a format, such as a JavaScript Object Notation (JSON) object (e.g., a JSON web token (JWT)), among others, for the communications of the data associated the embedded web component 534, such as a time limit in which access to the resources for the embedded web component 534 hosted on the resource server 508 is permitted, among others. The binding handler 522 may generate the access token 556 in accordance with a format, such as a JavaScript Object Notation (JSON) object (e.g., a JSON web token (JWT)), among others.

The access token 556 may identify or include a set of claims (sometimes herein referred to as parameters or information). At least a portion of the claims for the access token 556 may identify or include at least a portion of the context 552 or at least a portion of the partner token 550, among others. The set of claims for the access token 556 may identify or include any one of: the binding identifier 544; the registration information of the bound context 552 (HTML postMessage( ) function); the expiration time specifying or defining a duration of time in which the access token 556 is valid; an issue time defining or identifying a time (e.g., a time stamp) at which the access token 556 is created; the issuer identifier corresponding to the resource server 508; the token identifier uniquely referencing the access token 556 (e.g., to protect from replay); and the identifier corresponding to the customer device 502, the instance of the web application 530, or the user (e.g., the account or profile), among others. In some embodiments, the set of claims for the access token 556 may identify or include the partner token 550 itself, the bound context 552, and the code challenge information, among others. The code challenge information may identify or include the code challenge verifier, the code challenge hash, and the code challenge method, among others, as discussed above. With the generation, the binding handler 522 may store and maintain the access token 556 on the database 524. In some embodiments, the binding handler 522 may store and maintain an association between the access token 556 with the identifier corresponding to the customer device 502 on the database 524.

In conjunction, the resource provider 520 executing on the resource server 508 retrieves, obtains, or otherwise identifies content 558 (sometimes herein referred to as additional content) to provide to the embedded web component 534. The content 558 may identify or include data, such as additional instructions, an image, text, or multimedia, among others, to be inserted into the embedded web component 534 on the web application 530. For example, the content 558 may include instructions and graphical user interface (GUI) elements for various services, such as account information retrieval, transaction, or loan application in an online bank application. In some embodiments, the additional instructions of the content 558 may be executed by the parent web component 532 or in accordance with the instructions of the parent web component 532. The resource provider 520 may fetch or retrieve the content 558 from the database 524 (or another data source) for the embedded component 534. For example, the resource provider 520 may identify which content 558 to provide based on a content identifier (e.g., a uniform resource locator (URL)) included by the script in the parent web component 532 in the initial access request.

With the generation of the access token 556 and retrieval of the content 558, the resource provider 520 provides, sends, or otherwise transmits at least one response 560 to the access server 504. The response 560 may identify or include the access token 556 and the content 558, among others. The response 560 may identify or include a destination identifier corresponding to the customer device 502 (or the access server 504) to which the response 560 is to be sent. In some embodiments, the response 560 may be provided by the resource provider 520 to the customer device 502 via the access server 504 and the gateway server. The communication through the access server 504 and the gateway server may be encrypted or decrypted using the token or encryption key. The access server 504 in turn retrieves, identifies, or receives the response 560 from the resource server 508. Upon receipt, the access server 504 forwards, passes, or otherwise transmit the response 560 to the customer device 502.

The customer device 502 retrieves, identifies, or receives the response 560 including the access token 560 and the content 558 from the resource server 508. The response 560 may be received via the access server 504 or the gateway server, or both. Upon receipt, the customer device 502 may store and maintain the access token 556 and the content 558 (e.g., on a local storage). The customer device 502 may use the access token 556 to bind the embedded web component 534 with the parent web component 532. In conjunction, the customer device 502 may also load or present the content 558 on the embedded component 534 within the web application 530. The processing of the access token 556 and the presentation of the content 558 may be controlled or defined by the instruction in the parent embedded component 534.

By binding the two web components, data associated with user interactions with the content 558 presented on the embedded web component 534 may be sent, conveyed, or otherwise passed to the parent web component 532. The data may include invocations of a user interaction handler, requests from the customer device 502 in response to the user interaction, responses from the resource server 508 in response to corresponding requests, among others. For example, data associated with a screen touch detected via a screen touch event listener of the embedded web component 534 may be passed to a handler of the parent web component 532. In addition, the customer device 502 may communicate the data associated with the user interactions from the embedded web component 534 through the parent web component 532 to the resource server 508. Using the access token 556, the customer device 502 and the resource server 508 may communicate with each other data associated with the embedded web component 534. The communication through the embedded web component 534 may be performed in a secure and encrypted manner, thereby protecting any secure information entered through the embedded web component 534.

Figure 6:
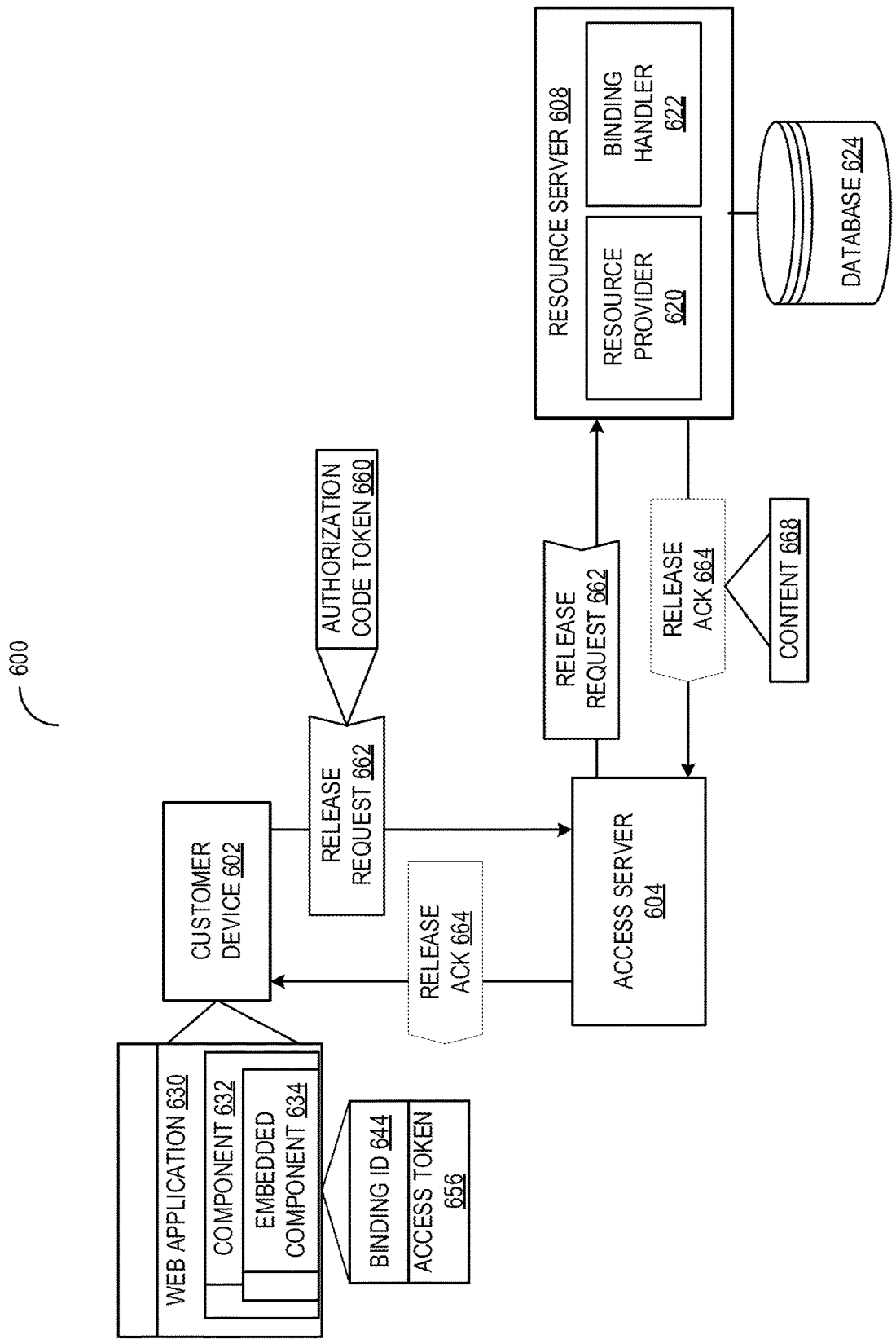
FIG. 6 depicts a block diagram of an example system for releasing embedded web components for accessing resources in accordance with an embodiment.

FIG. 6 depicts a block diagram of a system 600 for releasing embedded web components for accessing resources. The system 600 may include at least one customer device 602 (sometimes referred to herein as a client device or customer), at least one access server 604 (sometimes referred to herein as a partner server as a content publisher server), and at least one resource server 608 (sometimes referred to herein as a resource service or content provider server), among others. The customer device 602 may have received or receive at least one web application 630 from the access server 604. The web application 630 may include at least one parent web component 632 (sometimes herein referred to as a parent element or parent object) and at least one embedded web component 634 (sometimes herein referred to as a child component, element, or object). The embedded web component 634 may be loaded with the binding identifier 644 and the access token 656. The resource server 608 may include at least one binding handler 622.

Embodiments may comprise additional or alternative components or omit certain components from those of FIG. 6 and still fall within the scope of this disclosure. Various hardware and software components of one or more public or private networks may interconnect the various components of the system 600. Each component in system 600 (such as the customer device 602, the access server 604, and the resource server 608 and its subcomponents) may be any computing device comprising one or more processors coupled with memory and software and capable of performing the various processes and tasks described herein.

The customer device 602 may check or monitor for user interactions or communications corresponding to a completion of the embedded web component 634. The monitoring for the user interactions or communications may be in accordance with the instructions in the embedded web component 634 (or the parent web component 632). The customer device 602 may compare user interactions or communications with conditions for completion as specified by the embedded web component 634. When the interactions or communications do not match the conditions, the customer device 602 may continue to monitor. Otherwise, when the interactions or communications match the conditions, the customer device 602 may determine the completion of the actions provided by the embedded web component 634. For example, the customer device 602 may determine that actions provided by the embedded web component 634 are completed, upon receiving an acknowledgement of completion of a service (e.g., completion of account information retrieval or loan application) of the resource server 608 accessed through the embedded web component 634. In some embodiments, the customer device 602 may determine that the embedded web component 634 is complete, when the access token 656 provided for the embedded web component 634 is no longer valid (e.g., from the expiration time).

The customer device 602 may initiate termination, dismissal, or otherwise releasing of the binding between the embedded web component 634 and the parent web component 632. The initiation of the release by the customer device 602 may be in response to the detection of the completion of actions through the embedded web component 634 on the web application 630. For instance, the customer device 602 may commence the release procedure, in response to acknowledgement of the completion of the services (e.g., completion of account information retrieval or loan application) of the resource server 608 accessed through the embedded web component 634. The procedure to release the binding may be in accordance with the instructions in the embedded web component 634 in conjunction with the parent web component 632. For example, upon detecting completion, the embedded web component 634 may call or invoke the release procedure defined by a handler the parent web component 632.

From initiating, the customer device 602 may produce, output, or otherwise generate at least one authorization code token 660 using at least a portion of the access token 656 (e.g., the binding identifier 644). The authorization code token 660 may be used to verify the unbinding of the embedded web component 634 from the parent web component 632. The customer device 602 may generate the authorization code token 660 in accordance with a format, such as a JavaScript Object Notation (JSON) object (e.g., a JSON web token (JWT)), among others. The customer device 602 may generate the authorization code token 660 in accordance with the instructions in the parent web component 632 (or the embedded web component 634). In some embodiments, the customer device 602 may fetch or retrieve the authorization code token 660 from the access token 656.

The authorization code token 660 may identify or include a set of claims (sometimes herein referred to as parameters or information). At least a portion of the claims for the authorization code token 660 may identify or include at least a portion of the access token 656, among others. The set of claims for the access token 656 may identify or include any one of: the binding identifier 644; the expiration time specifying or defining a duration of time in which the authorization code token 660 is valid; an issue time defining or identifying a time (e.g., a time stamp) at which the authorization code token 660 is created; the issuer identifier corresponding to the customer device 602; the token identifier uniquely referencing the authorization code token 660 (e.g., to protect from replay); and the identifier corresponding to the customer device 602, the instance of the web application 630, or the user (e.g., the account or profile), among others. In some embodiments, the set of claims for the authorization code token 660 may identify or include the access token 656, the partner token, the bound context, and the code challenge information, among others. The code challenge information may identify or include the code challenge verifier, the code challenge hash, and the code challenge method, among others, as discussed above.

With the generation, the customer device 602 provides, sends, or otherwise transmits at least one release request 662 (sometimes herein referred to as an unbinding request or indication to unbind) to the resource server 608. The release request 662 may identify or include the authorization code token 660. The transmission of the release request 662 may be through the access server 604 and the gateway server. In some embodiments, the customer device 602 may transmit the release request 662 to the access server 604. The access server 604 may in turn generate the authorization code token 660 in the manner as detailed above. With the generation, the access server 604 may insert or include the authorization code token 660 in the release request 662, and may send the release request 662 to the resource server 608.

The binding handler 622 executing on the resource server 608 retrieves, identifies, or otherwise receives the release request 662 from the customer device 602. Upon receipt, the binding handler 622 may process or parse the release request 662 to extract or identify the authorization code token 660 therefrom. With the identification, the binding handler 622 may validate the authorization code token 660 based on the contents therein. From the authorization code token 660, the binding handler 622 may extract or identify the binding identifier 644, among other parameters. The binding handler 622 may access the database 624 to find, retrieve, or identify the binding identifier for the customer device 602 (e.g., using the identifier corresponding to the customer device 602 from the release request 662). The binding handler 622 may compare the binding identifier 644 identified from the authorization code token 660 with the binding identifier from the database 624 for the customer device 602.

If the binding identifiers do not match or correspond, the binding handler 622 may identify or determine that the authorization code token 660 is invalid. The binding handler 622 may also limit or restrict accessing of resources for the embedded web component 634. When the validation of the authorization code token 660 fails, the binding handler 622 may return, send, or otherwise transmit an indication of the failure to validate the authorization code token 660 to the customer device 602. The indication may be transmitted through the gateway server and the access server 604. The binding handler 622 may terminate the process of providing access to resources for the embedded web component 634 on the customer device 602. On other hand, if the binding identifiers match or correspond, the binding handler 622 may identify or determine that the authorization code token 660 is valid.

When the validation of the authorization code token 660 is successful, the binding handler 622 outputs, creates, or otherwise generates at least one release acknowledgement 664 (sometimes herein referred to as a release response or a response). The release acknowledgement 664 may be to indicate to the customer device 602 to finalize dismissal procedure of the embedded web component 634. In conjunction, the resource provider 620 may retrieve, obtain, or otherwise identify content 668 to provide to the embedded web component 634 to indicate termination of the embedded web component 634. The content 668 may identify or include data, such as additional instructions, an image, text, or multimedia, among others, to be inserted into the embedded web component 634 on the web application 630. The resource provider 620 may fetch or retrieve the content 668 from the database 524 (or another data source) for the embedded component 534. The binding handler 622 may insert or include the content 668 in the release acknowledgement 664.

The resource handler 620 provides, sends, or otherwise transmits at least one release acknowledgement 664 to the access server 604. The release acknowledgement 664 may identify or include the content 668, among others. The release acknowledgement 664 may identify or include a destination identifier corresponding to the customer device 602 (or the access server 604) to which the release acknowledgment 664 is to be sent. In some embodiments, the release acknowledgement 664 may be provided by the resource provider 620 to the customer device 602 via the access server 604 and the gateway server. The communication through the access server 604 and the gateway server may be encrypted or decrypted using the token or encryption key. The access server 604 in turn retrieves, identifies, or receives the release acknowledgement 664 from the resource server 608. Upon receipt, the access server 604 forwards, passes, or otherwise transmits the release acknowledgement 664 to the customer device 602.

The customer device 602 retrieves, identifies, or receives the release acknowledgement 664 including the content 668 from the resource server 608. The release acknowledgement 664 may be received via the access server 604 or the gateway server, or both. Upon receipt, the customer device 602 may finalize the termination process of unbinding between the embedded web component 634 and the parent web component 632. In conjunction, the customer device 602 may also load or present the content 668 on the embedded component 634 within the web application 630. The processing of the release acknowledgement 664 and the presentation of the content 668 may be controlled or defined by the instruction in the parent embedded component 634.

By passing the authorization code token 660 and finalizing the termination of the binding in this manner, the resource server 608 may prevent leakage of sensitive information through the embedded web component 634 once interactions are complete. The resource server 608 may also control accessing of the resources hosted thereon for services provided through the embedded web component 634 on the web application 630. The scheme may thus improve data security and privacy from accessing of the content from the resource server 608 while permitting the user to remain on the web application 630 provided by the access server 604.

Figure 7A:
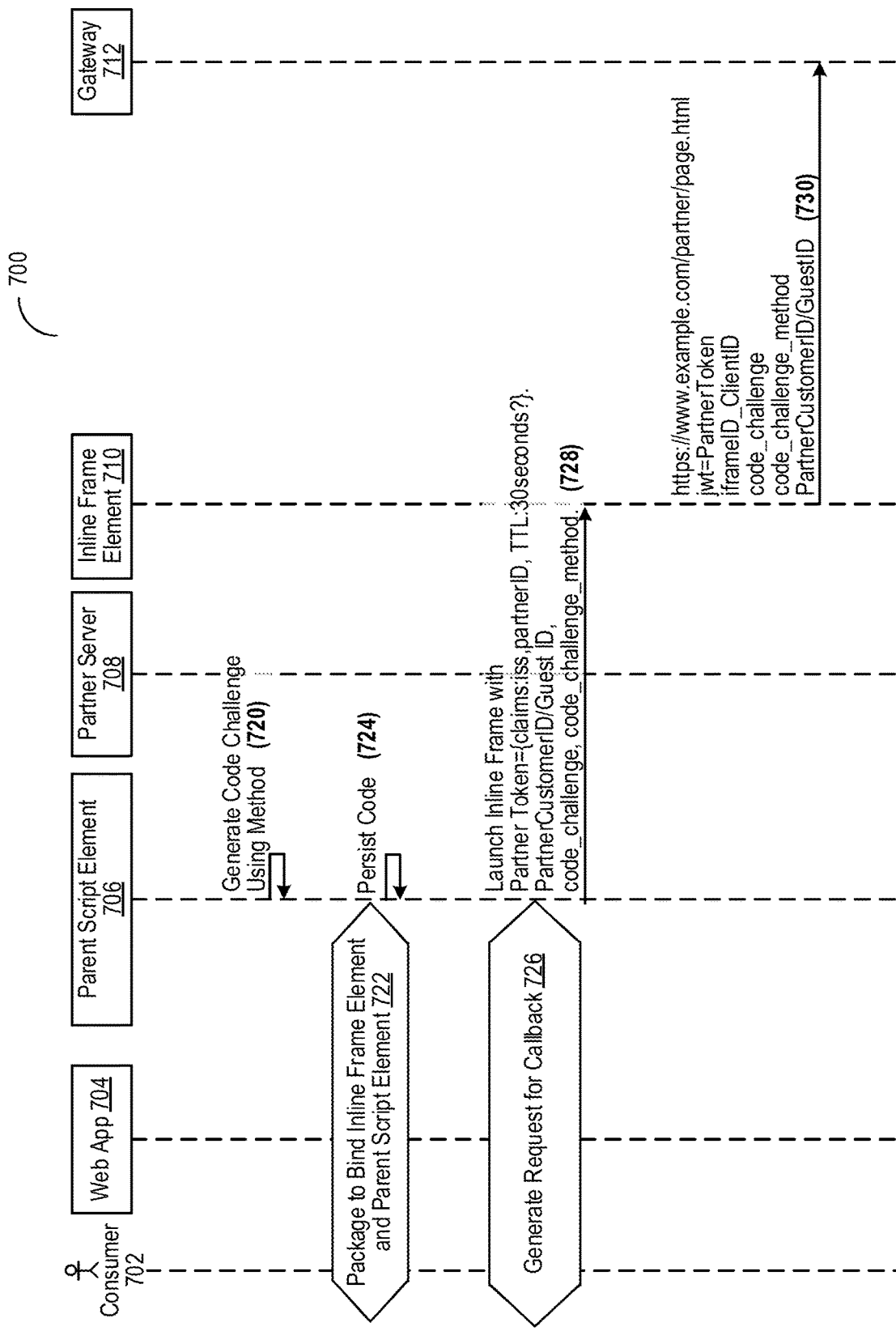

FIGS. 7A and 7B depict communication diagrams of a process 700 of launching embedded web components to bind with parent web components. Embodiments may include additional, fewer, or different operations from those described in the method 700. The method 700 may be performed by a server executing machine-readable software code, though it should be appreciated that the various operations may be performed by one or more computing devices and/or processors. The components and devices performing the process 700 may include a consumer device 702, a web application 704, a parent script element 706, a partner server 708, an inline frame element 710, a gateway 712, a validator 714, and a web server 718, among others. The web application 704, the parent script element 706, and the inline frame element 710 may be on the consumer device 702.

At step 720, the parent script element 706 generates a code challenge using a code challenge method. The code challenge may include a unique random number corresponding to a verifier and a hash value calculated in accordance with the code challenge method. At step 722, the customer device 702 in conjunction with the web application 704 and the parent script element 706 may package to bind the inline frame element 710 and the parent script element 706. At step 724, the parent script element 706 may persist the code challenge verifier generated in accordance with the code challenge method. At step 726, the consumer device 702 in conjunction with the web application 704 and the parent script element 706 may generate a request for a callback. At step 728, in generating the request, the parent script element 706 may launch the inline frame element 710 with a partner token. The partner token may be generated by the partner server 708, and may include a set of claims, such as an issuer identifier, a partner identifier, and a time-to-live (e.g., 30 seconds as depicted). At step 730, the inline frame element 710 may send a request including the partner token, an identifier corresponding to the inline frame element 710, code challenge information, and partner identifier, among other parameters to the gateway 712. The request may identify a destination address (e.g., "www.example.com/partner/page.html") to which the request is to be sent.

Continuing on, at step 732, the gateway 712 may pass the request to the validator 714. At step 734, the validator 714 may validate the partner token from the partner server 708. At step 736, in validating, the partner token may be used to prove the inline frame element 710 was launched from an approved context corresponding to the parent script element 706. At step 738, the partner token may have failed to be validated. When validation has failed, at step 740, the validator 714 may send an error message (e.g., HTTP 400 message) to the gateway 712. At step 742, the gateway 712 may forward the error message to the inline frame element 710. On the other hand, when the validation is successful, at step 744, the validator 714 may forward the request to the web server 718. The request may include the destination identifier (e.g., "partner/html?" as depicted) to which the request is to be sent.

Figure 8A:
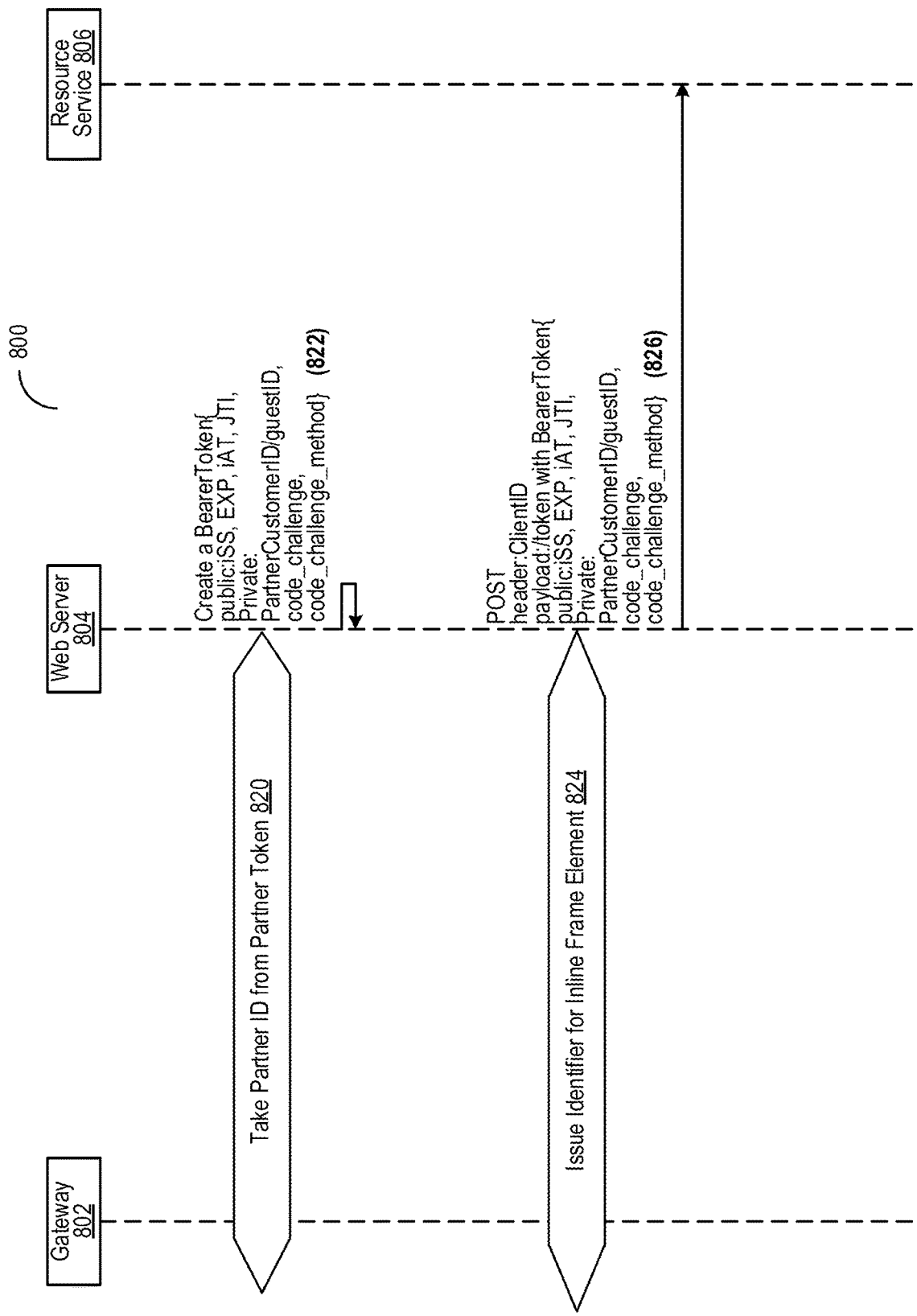
FIGS. 8A-C depict communication diagrams of an example process of generating access tokens for embedded web components in accordance with an embodiment.
Figure 8B:
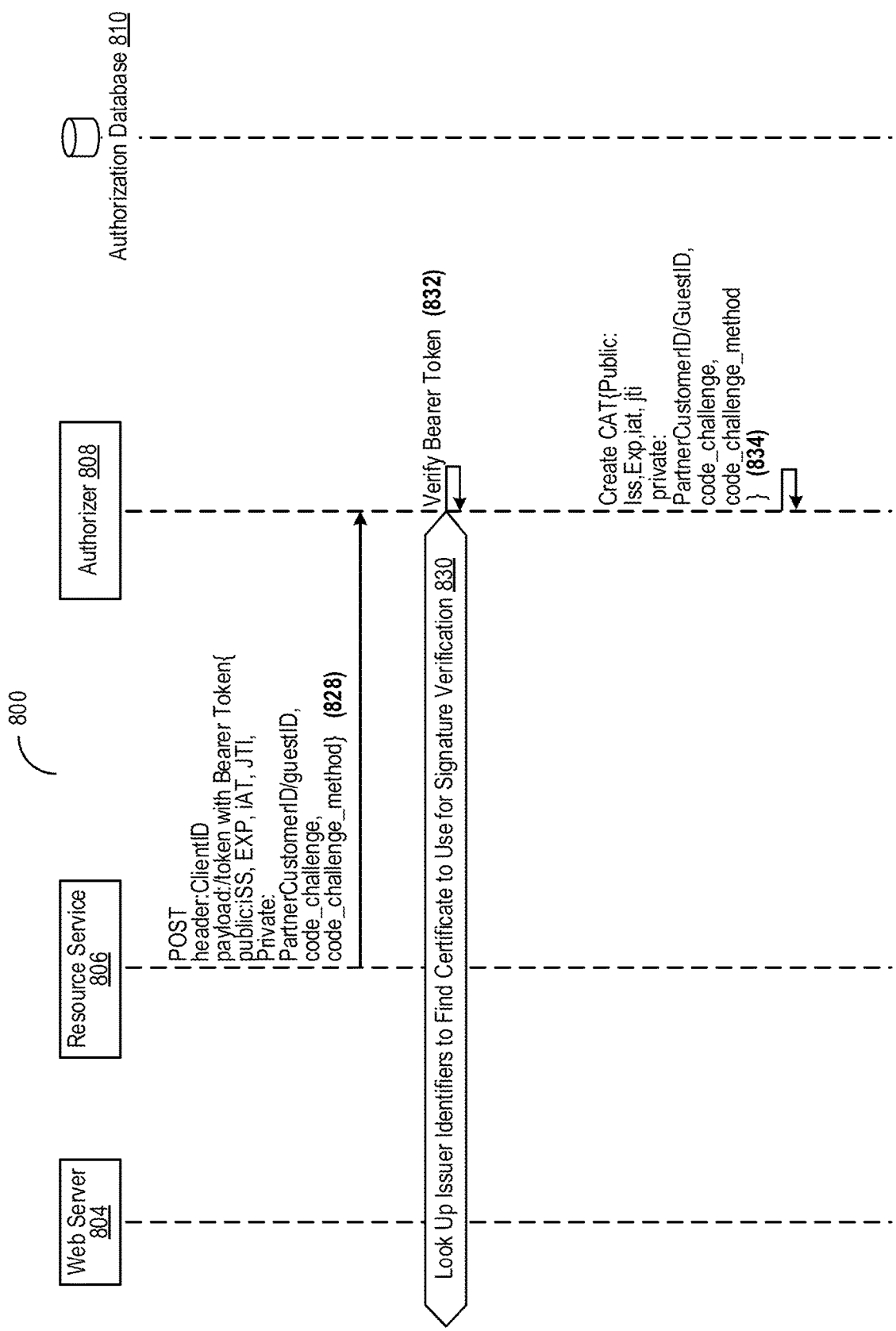
Figure 8C:
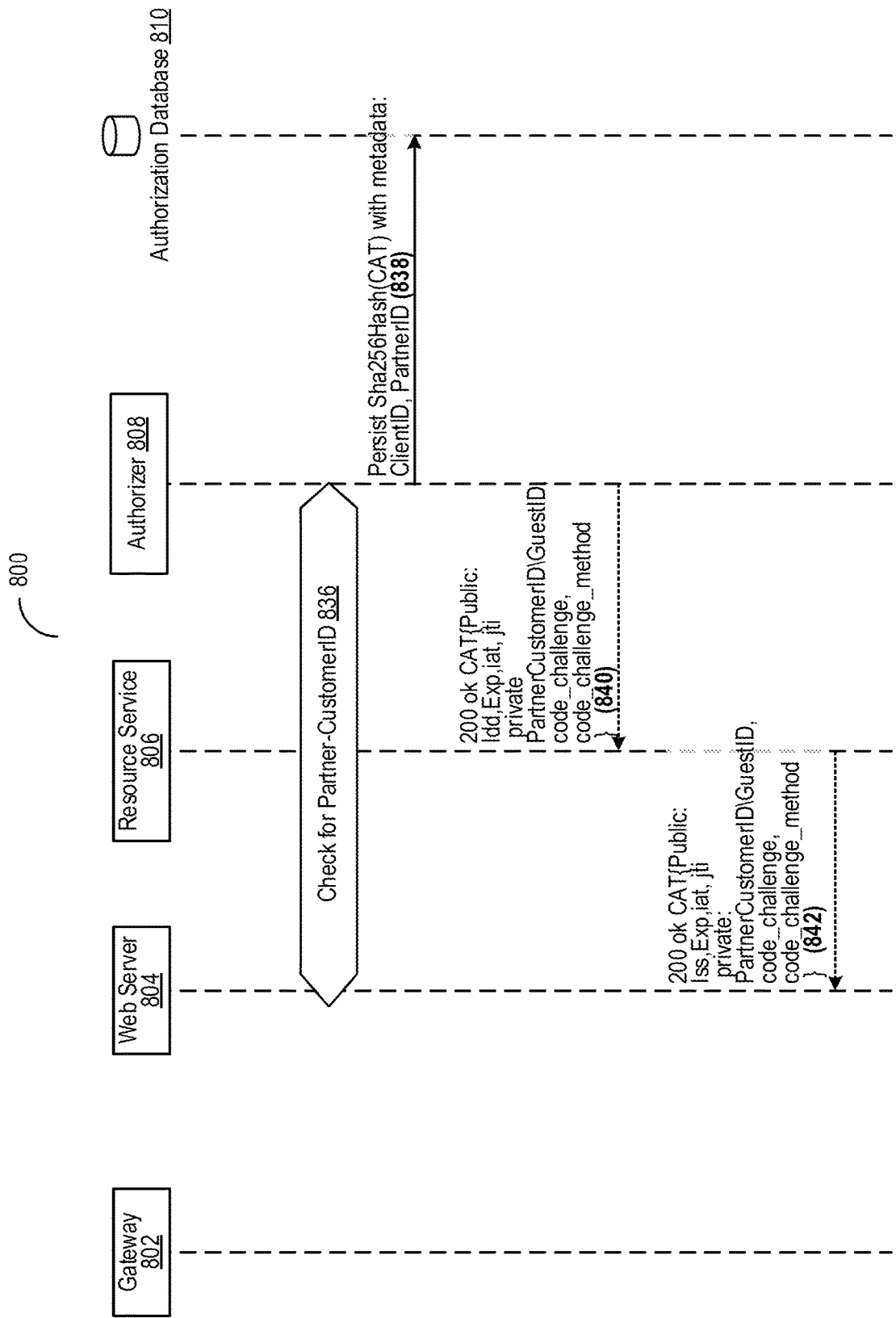

FIG. 8A-C depict communication diagrams of a process 800 of generating access tokens for embedded web components. Embodiments may include additional, fewer, or different operations from those described in the method 800. The method 800 may be performed by a server executing machine-readable software code, though it should be appreciated that the various operations may be performed by one or more computing devices and/or processors. The components and devices performing the process 800 may include a gateway 802, a web server 804, a resource server 806, an authorizer 808, and an authorization database 810.

At step 820, the web server 804 may take partner identifier from the partner token forwarded by the gateway 802. At step 822, the web server 804 may create a bearer token. The bearer token may include a set of public claims and a set of private claims. The set of public claims may include the issuer identifier, expiration time, issue time, and token identifier, among others. The set of private claims may include the partner identifier, customer device identifier, code challenge, and code challenge method, among others. At step 824, the web server 804 may issue an identifier for an inline frame element of a web application. As step 826, the web server 804 may send a request including the bearer token in the payload to the resource service 806. The request may be in the form of an HTTP Post function, with a client identifier in the header.

Continuing on, at step 828, the resource service 806 may forward the request including the bearer token in the payload to the inline frame authorizer 808. At step 830, the authorizer 808 may look up issuer identifiers to find a certificate to use for signature verification of the bearer token. At step 832, the authorizer 808 may verify the bearer token using the signature. At step 834, the authorizer 808 may generate a customer access token (CAT) based in part on the bearer token. The customer access token may include a set of public claims and a set of private claims. The set of public claims may include an issuer identifier, an issue time, and an expiration time, among others. The set of private claims may include partner identifier, a customer device identifier, code challenge, and a code challenge method, among others.

In addition, at step 836, the authorizer 808 may check for a partner identifier or a customer identifier from the web server 804 or the resource server 806. With the check, at step 838, the authorizer 808 may persist a hash of the customer access token with metadata (e.g., the customer identifier, and partner identifier, among others) on the authorization database 810. At step 840, the authorizer 808 may send a response including the customer access token to the resource service 806. The response may be in the format of a HTTP 200 OK response. At step 842, the resource service 806 may forward the response to the web server 804. The web server 804 may transmit the response to the customer device via the gateway 802.

Figure 9A:
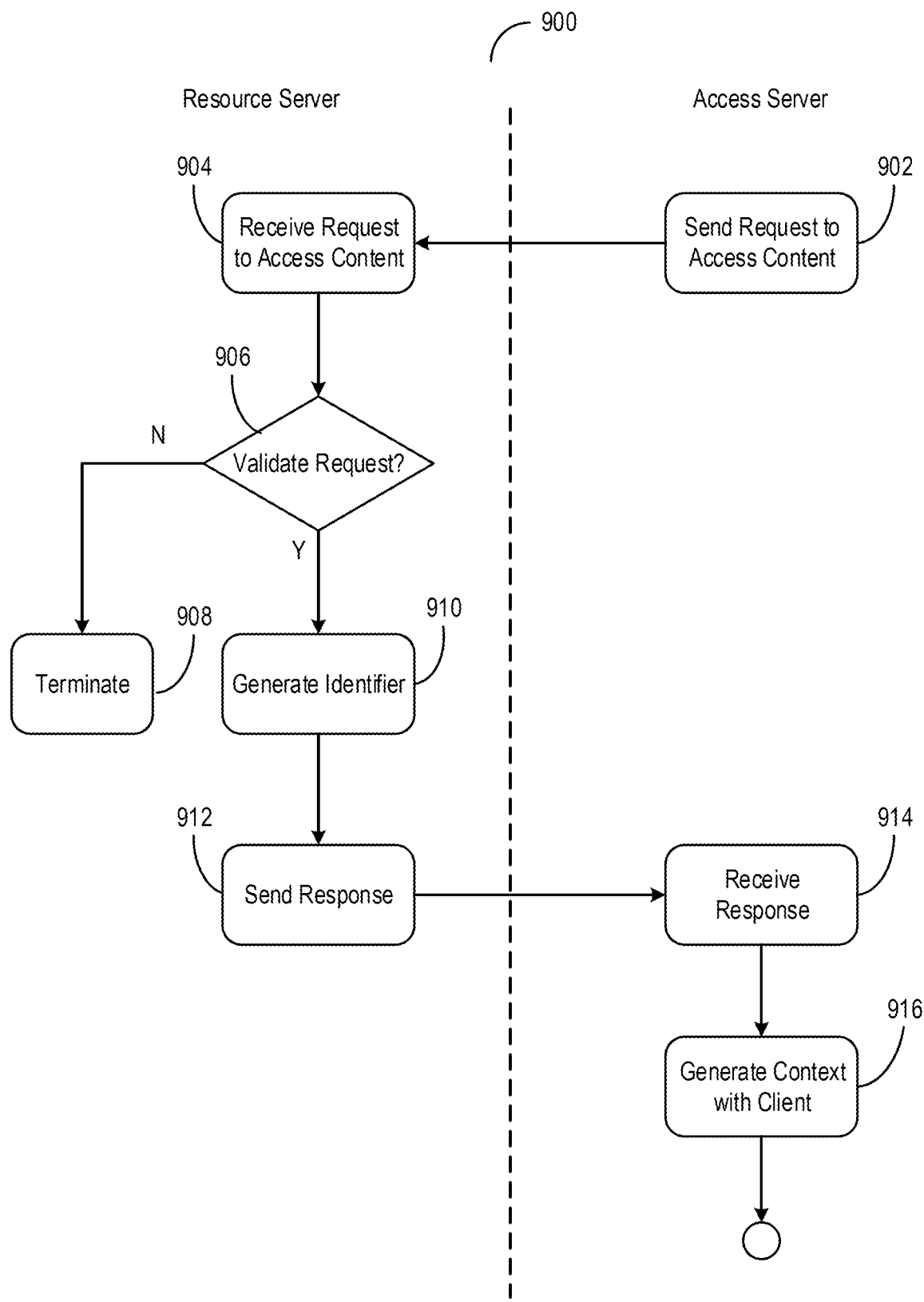
FIGS. 9A-C depict flow diagrams of an example method of binding web components to protect accessing of resources in accordance with an embodiment.
Figure 9B:
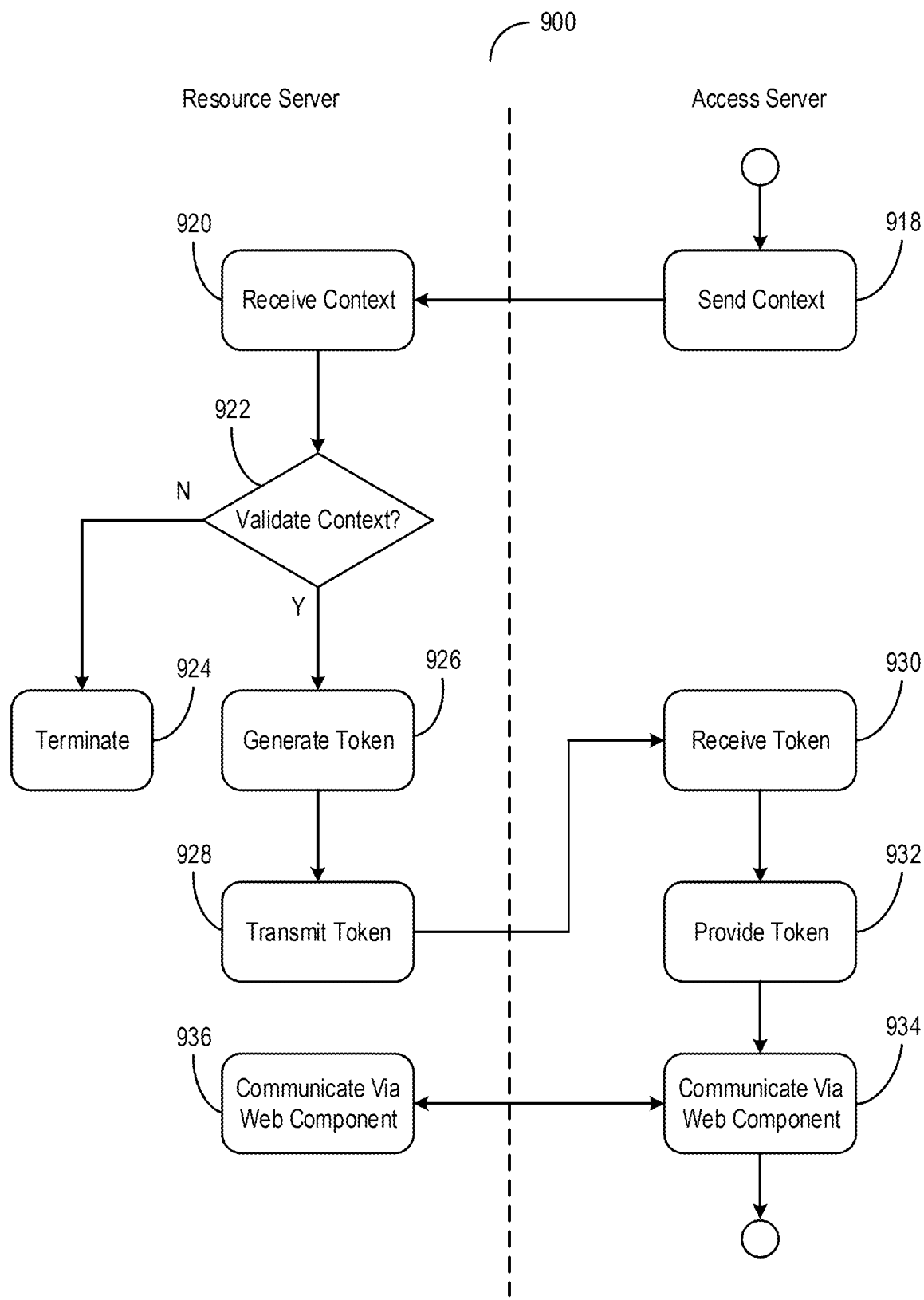
Figure 9C:
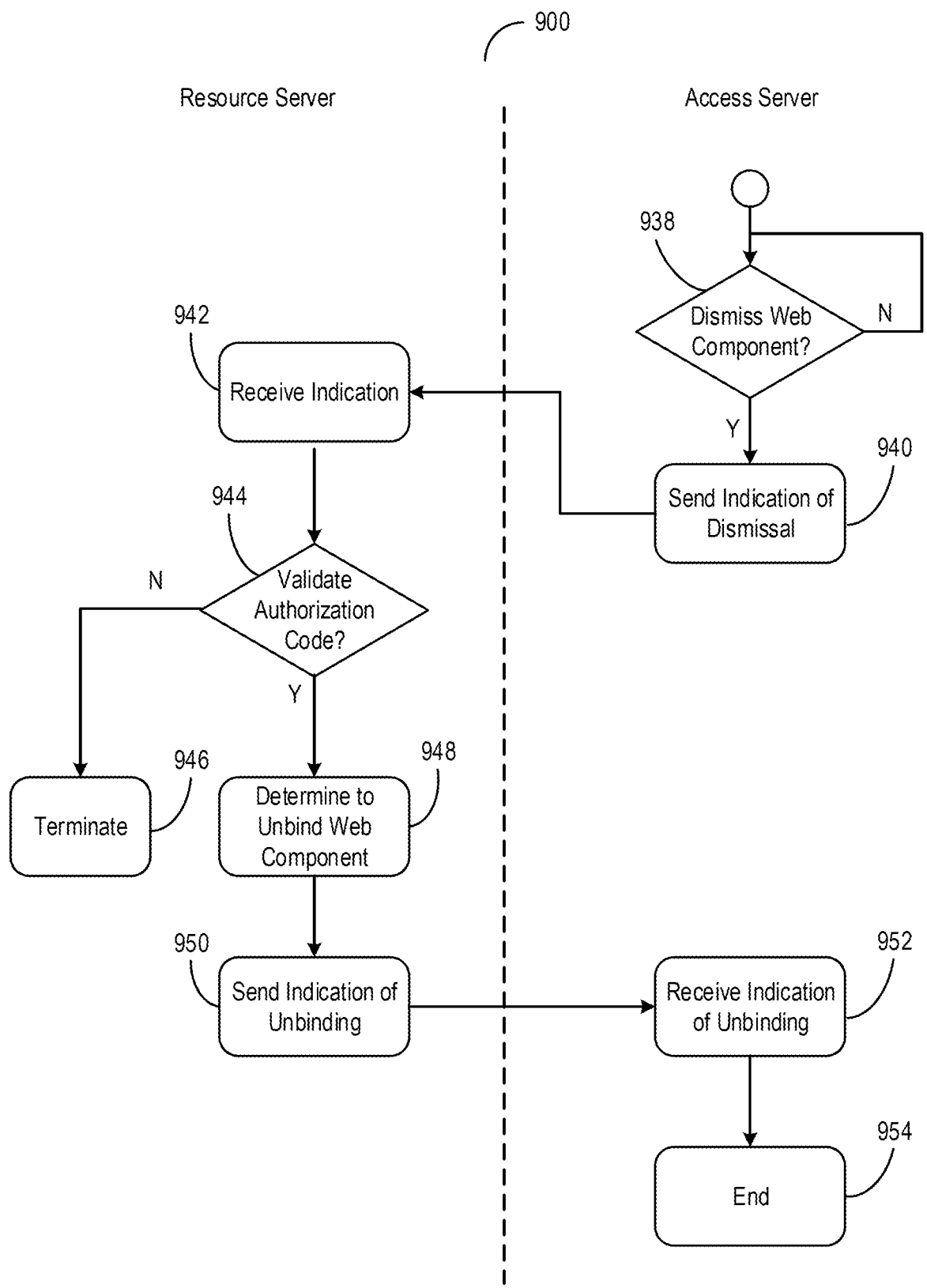

FIGS. 9A-C depict flow diagrams of a method 900 of binding web components to protect accessing of resources. Embodiments may include additional, fewer, or different operations from those described in the method 900. The method 900 may be performed by a server executing machine-readable software code, though it should be appreciated that the various operations may be performed by one or more computing devices and/or processors.

At step 902, an access server send a request to access content to a resource server. The request may have originated from a customer device that loaded a web application including a parent web component and an embedded web component. The request may include a request token. The request token may identify a set of claims, such as an expiration time, a duration time, an issuer identifier, and a token identifier, among others. The request token may be signed or encrypted by the access server using an encryption key (e.g., a private key) generated by the access server. At step 904, the resource server may receive the request to access from the access server. The resource server may parse the request to extract or identify the request token.

At step 906, the resource server may determine whether the request to access is valid. To determine, the resource server may determine whether the token in the request was signed using the encryption key. The resource server may decrypt at least a portion of the token (e.g., an identifier corresponding to the access server) using the encryption key. Once decrypted, the resource server may determine whether the identifier is found on a list of trusted servers. If the identifier is determined to be not on the list, the resource server may determine that the request is invalid. If the identifier is determined to be on the list, the resource server may determine that the request is valid. In some embodiments, the gateway may perform the determination, and provide an indication of the validation results to the resource server.

At step 908, when the request is determined to be invalid, the resource server may terminate the method. The resource server may return an indication of failing to validate to the access server. On the other hand, at step 910, when the request is determined to be valid, the resource server may generate a binding identifier. The binding identifier may be used to bind the embedded web component with the parent web component to permit access to the resources for the embedded web component hosted on the resource server. At step 912, the resource server may send a response including the binding identifier to the access server. At step 914, the access server may receive the response from the resource server. At step 916, the access server may provide the binding identifier in a partner token to the customer device to generate a context. The context may be to integrate or bind at least a portion of the functionalities of the embedded web component with the parent web component, such as to permit passage of data from user interactions from the embedded web component to the parent web component. The context may include a portion of a partner token, such as the binding identifier, expiration time, issue time, issuer identifier, registration information, and code challenge information, among others.

At step 918, the access server may send the context to the resource server. At step 920, the resource server may receive the context from the access server. Upon receipt, the resource server may parse the context to extract its contents, such as the binding identifier, among others. At step 922, the resource server may determine whether the context is valid. To determine, the resource server may compare the binding identifier parsed from the context with the binding identifier stored for the customer device on a database. When the identifiers match, the resource server may determine that the context is valid. Otherwise when the identifiers do not match, the resource server may determine that the context is invalid.

At step 924, if the context is determined to be invalid, the resource server may terminate, and may restrict access to the resource for the embedded web component. At step 926, if the context is determined to be valid, the resource server may generate an access token. The access token may be used to finalize or confirm the binding of the embedded web component with the parent web component. The access token may include a set of claims, such as the binding identifier, the registration information, an expiration time, an issue time, an issue identifier, and code challenge information, among others. At step 928, the resource server may transmit the token along with content for the embedded web component to the access server. At step 930, the access server may receive the token along with the content from the resource server.

At step 932, the access server may provide the token and the content to the customer device. The customer device may load the token and the content in accordance with the parent web component. The token may be used to bind the embedded web component with the parent web component. The content may be presented in the embedded web component. At steps 934 and 936, the resource server and the access server may communicate data via the embedded web component. The data may be associated with the embedded web component and may include requests made in response to a user interaction with the embedded web component on the customer device and responses in response to such requests, among others. As the embedded web component is bound with the parent web component using the token, the data may be protected.

At step 938, the access server may monitor the customer device for a dismissal of the embedded web component. In some embodiments, the customer device may monitor for the dismissal of the embedded web component. The dismissal may correspond to user interactions, communications, or any other conditions associated with a completion of the services provided through the embedded web component. The completion of services may in turn initiate the releasing of the binding of the embedded web component from the parent web component. When no conditions are satisfied, the access server may continue to monitor the customer device. When at least one condition is satisfied, the access server may determine that the embedded web component is dismissed.

At step 940, if the embedded web component is determined to be dismissed, the access server may also send an indication of the dismissal to the resource server. The indication may include an authorization code token. The authorization code token may identify at least one of the access token, such as the binding identifier. At step 942, the resource server may receive the indication from the access server. The access server may parse the indication to identify the binding identifier from the authorization code token. At step 944, the resource server may determine whether the authorization code token is valid. To validate, the resource server may compare the binding identifier identified from the authorization code token with the binding identifier on the database. When the identifiers do not correspond, the resource server may determine that the authorization code token is invalid. When the identifiers correspond, the resource server may determine that the authorization code token is valid.

At step 946, if the authorization code token is determined to be invalid, the resource server may terminate the process, and may restrict further access to the resources for the embedded web component. At step 948, if the authorization code token is determined to be valid, the resource server may determine to unbind the embedded web component from the parent web component. With the determination, at step 950, the resource server may send an indication to unbind from the access server. At step 952, the access server may receive the indication from the resource server. The access server may provide the indication to the customer device, and the customer device may in turn conclude the unbinding of the embedded web component from the parent web component. At step 954, the access server may end the process.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
   receiving, by a first server from a second server, a request to provide access to content for a first web component on a web application of a customer device;
   determining, by the first server, whether to issue an identifier corresponding to the first web component to the customer device responsive to a validation of the request;
   generating, by the first server responsive to the determination, the identifier to bind the first web component with a second web component to permit access to the content for the first web component on the web application of the customer device, wherein the second web component is configured to receive content of the first web component;
   transmitting, by the first server to the second server, a response including the identifier and the content; and
   communicating, by the first server via the second server, data associated with a user interaction with the content presented on the first web component bound with the second web component using the identifier.

2. The method of claim 1, further comprising:
   receiving, by the first server, from the customer device via the second server, a context to bind the first web component with the second web component, the context including a first token generated by the second web component using the identifier;
   generating, by the first server, responsive to validating the context, a second token using at least a portion of the context; and
   transmitting, by the first server to the second server, the second token to encrypt the communications of the data from the first web component.

3. The method of claim 2, wherein receiving the context further comprises receiving the context including (i) the first token and (ii) an information to permit communications between the first web component and the second web component; and
   wherein generating the second token further comprises generating the second token to include at least a portion of the first token and the information.

4. The method of claim 1, further comprising:
   receiving, by the first server, from the customer device via the second server, an indication to unbind the first web component from the second web component responsive to a termination of the first web component, the indication identifying an authorization code token generated using the identifier;
   determining, by the first server responsive to validating the authorization code token of the indication, to unbind the first web component from the second web component.

5. The method of claim 4, further comprising:
   identifying, by the first server from the authorization code token of the indication, the identifier; and
   validating, by the first server, the authorization code token responsive to the identifier identified from the authorization code token matching the identifier transmitted in the response.

6. The method of claim 1, further comprising:
   determining, by the first server responsive to failure to validate a second request, that the customer device is not to be issued with a second identifier corresponding to a third web component of a second customer device; and
   transmitting, by the first server to a third server, an indication to deny the third web component access to content of the first server, responsive to determining that the customer device is not to be issued with the second identifier.

7. The method of claim 1, further comprising validating, by the first server, the request responsive to a gateway identifying the second server from which the request is received as permitted to access the first server.

8. The method of claim 1, wherein receiving the request further comprises receiving the request access to content for an inline frame launched by the application the customer device responsive to accessing a webpage.

9. The method of claim 1, wherein transmitting the response further comprises transmitting the response to cause the second server to generate a token using the identifier to encrypt the communications of the data associated with the user interactions with the first web component.

10. The method of claim 1, wherein generating the identifier further comprises generating the identifier referencing a binding of the first web component with the second web component.

11. A system, comprising:
a first server having one or more processors coupled with memory, configured to:
receive, from a second server, a request to provide access to content for a first web component on a web application of a customer device;
determine whether to issue an identifier corresponding to the first web component to the customer device responsive to a validation of the request;
generate, responsive to the determination, the identifier to bind the first web component with a second web component to permit access to the content for the first web component on the web application of the customer device, wherein the second web component is configured to receive content of the first web component;
transmit, to the second server, a response including the identifier and the content; and
communicate, via the second server, data associated with a user interaction with the content presented on the first web component bound with the second web component using the identifier.

12. The system of claim 11, wherein the first server is further configured to:
receive, from the customer device via the second server, a context to bind the first web component with the second web component, the context including a first token generated by the second web component using the identifier;
generate, responsive to validating the context, a second token using at least a portion of the context; and
transmit, to the second server, the second token to encrypt the communications of the data from the first web component.

13. The system of claim 12, wherein the first server is further configured to:
receive the context including (i) the first token and (ii) an information to permit communications between the first web component and the second web component; and
generate the second token to include at least a portion of the first token and the information.

14. The system of claim 11, wherein the first server is further configured to:
receive, from the customer device via the second server, an indication to unbind the first web component from the second web component responsive to a termination of the first web component, the indication identifying an authorization code token generated using the identifier;
determine, responsive to validating the authorization code token of the indication, to unbind the first web component from the second web component.

15. The system of claim 14, wherein the first server is further configured to:
identify, from the authorization code token of the indication, the identifier; and
validate the authorization code token responsive to the identifier identified from the authorization code token matching the identifier transmitted in the response.

16. The system of claim 11, wherein the first server is further configured to:
determine, responsive to failure to validate a second request, that the customer device is not to be issued with a second identifier corresponding to a third web component of a second customer device; and
transmit, to a third server, an indication to deny the third web component access to content of the first server, responsive to determining that the customer device is not to be issued with the second identifier.

17. The system of claim 11, wherein the first server is further configured to validate the request responsive to a gateway identifying the second server from which the request is received as permitted to access the first server.

18. The system of claim 11, wherein the first server is further configured to receive the request access to content for an inline frame launched by the application the customer device responsive to accessing a webpage.

19. The system of claim 11, wherein the first server is further configured to transmit the response to cause the second server to generate a token using the identifier to encrypt the communications of the data associated with the user interactions with the first web component.

20. The system of claim 11, wherein the first server is further configured to generate the identifier referencing a binding of the first web component with the second web component.

* * * * *